(12) United States Patent
Sugimoto

(10) Patent No.: US 8,199,203 B2
(45) Date of Patent: Jun. 12, 2012

(54) IMAGING APPARATUS AND IMAGING METHOD WITH FACE DETECTION BASED ON SCENE RECOGNITION RESULTS

(75) Inventor: Masahiko Sugimoto, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 265 days.

(21) Appl. No.: 12/511,899

(22) Filed: Jul. 29, 2009

(65) Prior Publication Data

US 2010/0026836 A1 Feb. 4, 2010

(30) Foreign Application Priority Data

Jul. 30, 2008 (JP) ................................. 2008-197003

(51) Int. Cl.
*H04N 5/228* (2006.01)
(52) U.S. Cl. ................. 348/208.14; 348/222.1; 348/169
(58) Field of Classification Search .................. 348/169, 348/208.14, 222.1
See application file for complete search history.

(56) References Cited

U.S. PATENT DOCUMENTS

| 7,796,163 | B2 | 9/2010 | Sugimoto |
| 7,796,182 | B2 | 9/2010 | Konishi |
| 7,817,202 | B2 * | 10/2010 | Ogasawara et al. ....... 348/333.03 |
| 7,920,205 | B2 * | 4/2011 | Awazu ........................... 348/371 |
| 7,982,791 | B2 * | 7/2011 | Nonaka et al. ............ 348/333.01 |

FOREIGN PATENT DOCUMENTS

| JP | 2003-244530 | | 8/2003 |
| JP | 2003-344891 | | 12/2003 |
| JP | 2006-208558 | A | 8/2006 |
| JP | 2006-301378 | A | 11/2006 |
| JP | 2007-194917 | A | 8/2007 |
| JP | 2008-54293 | A | 3/2008 |

OTHER PUBLICATIONS

Notification of Reasons for Rejection dated Jan. 16, 2012 (with an English translation).

\* cited by examiner

*Primary Examiner* — Gevell Selby
(74) *Attorney, Agent, or Firm* — McGinn IP Law Group, PLLC

(57) ABSTRACT

It is an object of the present invention to provide an imaging apparatus and an imaging method which enable various functions using face detection to be individually controlled in accordance with scene recognition results and which achieve more favorable imaging and image processing. To achieve the object, in an aspect of the present invention, information on a photographic scene is acquired to recognize the scene and to detect whether or not a face exists in the photographic scene, and various controls are performed based on the scene recognition result and the face detection result. That is, when performing various controls using face detection such as face frame display, face AE, face AF, face AWB, face tonal correction, and the like, it is now possible to individually control how such controls are to be performed based on a scene recognition result and achieve more favorable imaging and image processing in accordance with the scenes.

19 Claims, 18 Drawing Sheets

FIG.4

SCENE RECOGNITION RESULTS AND FACE DETECTION USAGE CONTROL

| SCENE RECOGNITION | FACE FRAME DISPLAY | FACE AE | FACE AF | FACE AWB | FACE TONAL CORRECTION |
|---|---|---|---|---|---|
| AUTO | ○ | ○ | ○ | ○ | ○ |
| PORTRAIT | ○ | ○ | ○ | ○ | ○ |
| LANDSCAPE | ○ | ○ | ○ | × | × |
| NIGHT SCENE | ○ | ○ | ○ | × | × |
| MACRO | ○ | ○ | ○ | ○ | ○ |

IMAGING APPARATUS AND IMAGING METHOD WITH FACE DETECTION BASED ON SCENE RECOGNITION RESULTS

BACKGROUND OF THE INVENTION

1. Field of the Invention

The present invention relates to an imaging apparatus and an imaging method and, in particular, to a technique for varying the usage of face detection based on scene recognition results.

2. Description of the Related Art

Japanese Patent Application Laid-Open No. 2003-244530 discloses a digital still camera in which a judgment of whether or not a set photographic mode is appropriate with respect to a scene is made based on a digital image signal and an EV value.

Japanese Patent Application Laid-Open No. 2003-344891 discloses a photographic mode auto-setting camera that sets a photographic mode of a camera based on output information from a face recognizing device and a state detecting device. The camera described in Japanese Patent Application Laid-Open No. 2003-344891 automatically sets a camera photographic mode based on output information that is subject movement, imaging magnification, or subject distance. In addition, Japanese Patent Application Laid-Open No. 2003-344891 provides a description of not only detecting a face of a person, but also distinguishing among a portrait mode, a multi-person mode, and a group photo mode as photographic modes depending on the number of persons and photographic magnification.

SUMMARY OF THE INVENTION

The invention described in Japanese Patent Application Laid-Open No. 2003-244530 is designed to judge whether or not a set photographic mode is suitable for a photographic scene and is not intended to perform scene recognition.

In addition, while the invention described in Japanese Patent Application Laid-Open No. 2003-344891 is designed to perform scene recognition based on output information of a face recognizing device and a state detection device and to automatically set various photographic modes including a portrait mode, no description is given as to how various functions using a scene recognition result and a face detection result are to be controlled.

The present invention has been made in consideration of such circumstances and an object thereof is to provide an imaging apparatus and an imaging method which enable various functions using face detection to be individually controlled in accordance with scene recognition results and which achieve more favorable imaging and image processing.

In order to solve the problems described above, an imaging apparatus according to a first aspect of the present invention comprises: an information acquiring device which acquires information on a photographic scene; a scene recognizing device which recognizes a scene from the acquired information; a face detecting device which detects whether or not a face exists in a photographic scene; and a control device which performs various controls based on a scene recognition result and a face detection result. In other words, by arranging various controls to be performed based on a result of scene recognition which recognizes that a subject is in a predetermined situation (i.e., photographic scene or scene) and a face detection result, when performing various controls using face detection, it is now possible to individually control how such controls are to be performed (whether or not control should be performed) based on a scene recognition result and to achieve more favorable imaging and image processing in accordance with the scenes. Incidentally, in the present invention, "information on a photographic scene" means "photographic information".

An imaging apparatus according to a second aspect of the present invention is the imaging apparatus according to the first aspect, wherein the information acquiring device acquires at least one of: information indicating whether or not a human face exists in a photographic scene; information corresponding to subject distance; and information corresponding to the brightness of a subject. Moreover, information indicating whether a face exists or not can be acquired from the face detecting device.

An imaging apparatus according to a third aspect of the present invention is the imaging apparatus according to the first or second aspect, wherein the control device includes two or more of: a display control device which explicitly displays the position of a detected face on a screen of a display device displaying a live view image; an exposure control device which controls exposure based on the brightness of an area of the detected face; an automatic focus adjusting device which performs focus adjustment so that the detected face comes into focus; a white balance adjusting device which adjusts white balance based on color information of the area of the detected face; and a face tonal correcting device which performs tonal correction based on the brightness of the area of the detected face. That is, the control device is arranged so as to be capable of individually controlling, in accordance with scene recognition results, the various controls of: explicitly displaying the position of a detected face using a face frame or the like on a live view image in response to a face detection result; controlling exposure based on the brightness of an area of the detected face; performing focus adjustment so that the detected face comes into focus; adjusting white balance based on color information of the area of the detected face; or performing tonal correction based on the brightness of an area of the detected face.

An imaging apparatus according to a fourth aspect of the present invention is the imaging apparatus according to any of the first to third aspects, wherein the control device has a table storing information indicating whether or not control is to be performed for each control type or information indicating the intensity of control in correspondence with scene types and types of various controls, and based on a scene recognition result and a face detection result, reads corresponding information from the table to perform various controls.

An imaging apparatus according to a fifth aspect of the present invention is the imaging apparatus according to the fourth aspect, further comprising a custom setting device which enables a user to freely set information stored in the table. That is, when various controls using face detection is to be performed, by enabling a user to freely set how such control is to be performed in accordance with scene detection results, control accommodating user preferences is now possible.

An imaging apparatus according to a sixth aspect of the present invention is the imaging apparatus according to any of the first to fifth aspects, wherein the scene recognizing device includes: a storage device which t stores information corresponding to a recognized scene as reference information; and a scene change discriminating device which discriminates whether or not a scene has changed based on reference information stored in the storage device and information acquired by the information acquiring device, and the scene recognizing device performs scene recognition when it is discriminated that a scene has changed.

An imaging apparatus according to a seventh aspect of the present invention is the imaging apparatus according to any of the first to fifth aspects, wherein the scene recognizing device includes an interval setting device which sets a predetermined interval at which scene recognition is performed, and the scene recognizing device performs scene recognition of a photographic scene based on information acquired by the information acquiring device at the predetermined interval set by the interval setting device. According to the sixth and seventh aspects of the present invention, scene recognition results can now be obtained in a stable manner.

An imaging method according to an eighth aspect of the present invention comprises: an information acquiring step of acquiring information on a photographic scene; a scene recognizing step of recognizing a scene from the acquired information; a face detecting step of detecting whether or not a face exists in a photographic scene; and a control step of performing various controls based on a scene recognition result and a face detection result.

According to the present invention, when performing various controls using face detection, it is now possible to individually control how such controls are to be performed (whether or not control should be performed) based on a scene recognition result and achieve more favorable imaging and image processing in accordance with the scenes.

BRIEF DESCRIPTION OF THE DRAWINGS

FIG. 4 is a table showing an example of relationships among various function using scene detection results and face detection;

DETAILED DESCRIPTION OF THE PREFERRED EMBODIMENTS

Preferred embodiments of an imaging apparatus and an imaging method according to the present invention will now be described with reference to the accompanying drawings.

[Configuration of Imaging Apparatus]

Figure 1:
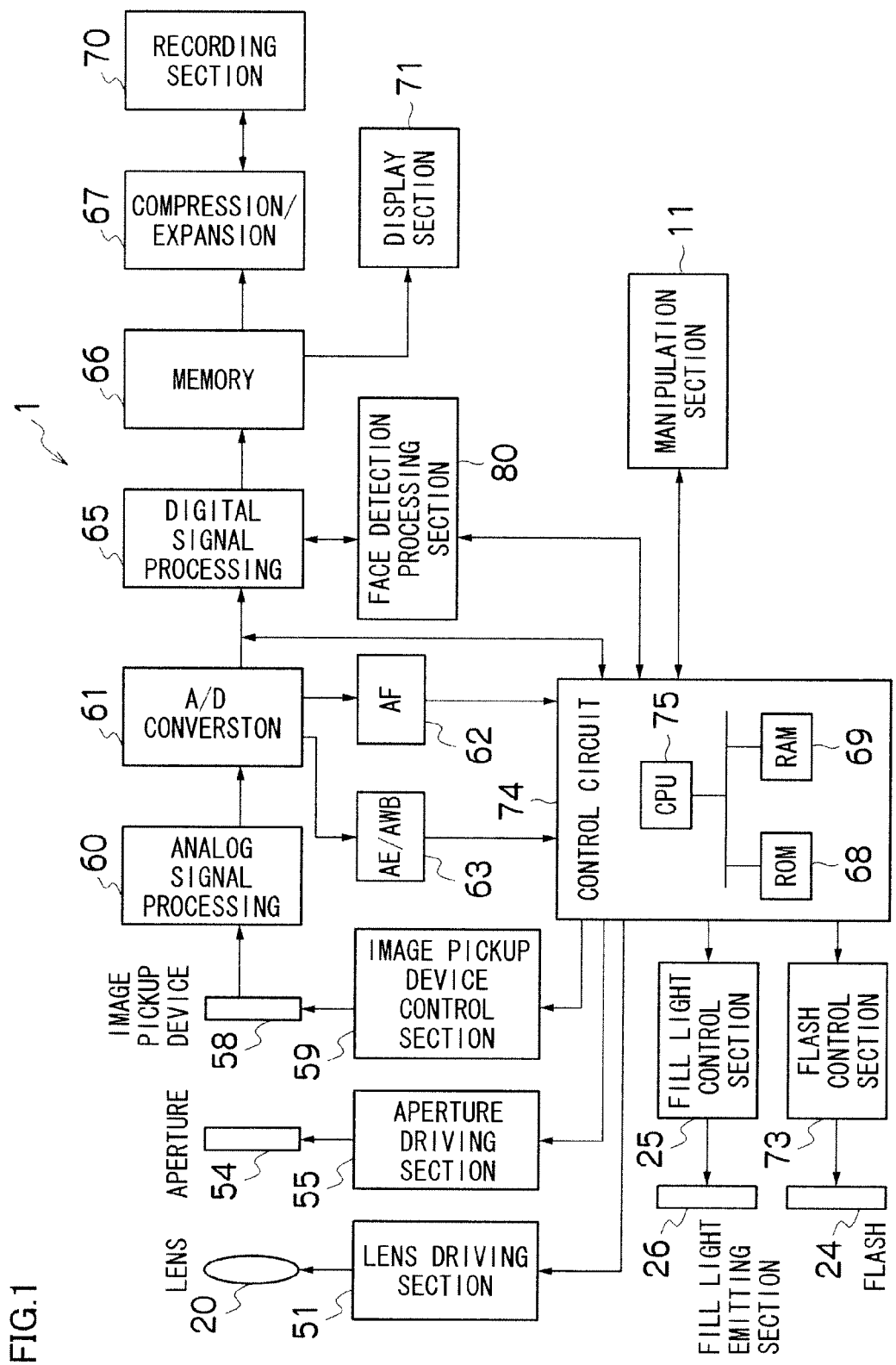
FIG. 1 is a schematic block diagram showing a configuration of a digital camera.

FIG. 1 is a block diagram showing a first embodiment of an imaging apparatus (digital camera) according to the present invention.

The imaging apparatus (hereinafter referred to as digital camera 1) is arranged so as to convert image data acquired through photography into an Exif-format image file and to record the Exif-format image file in a recording section 70 such as an external recording medium that is attachable/detachable to a main body.

As shown in FIG. 1, the digital camera 1 includes: a manipulation section 11 and a control circuit 74 that interprets contents of manipulations performed on the manipulation section 11 and controls the respective sections.

The manipulation section 11 includes: an operating mode switch that switches operating modes between a photographic mode for photographing images and a playback mode for reading an image recorded on the recording section 70 and displaying the image on a display section 71; a menu/OK button; a zoom/upward/downward arrow lever; a leftward/rightward arrow button; a Back (return) button; a display switching button; a release button; and a power switch.

The control circuit 74 includes: a CPU 75 that performs information processing; a ROM 68 on which is recorded programs defining information processing such as scene recognition according to the present invention, firmware, constants such as thresholds to be used by the programs when performing various judgments, and the like; and a RAM 69 storing variables, data, and the like necessary for information processing.

The CPU 75 controls various sections of the digital camera 1 based on signals from the various processing sections such as the manipulation section 11 and an AF processing section 62. The ROM 68 stores various constants to be set by the digital camera 1, programs to be executed by the CPU 75, and the like. The RAM 69 temporarily stores data required by the CPU 75 to execute the programs.

A lens 20 includes a focusing lens and a zoom lens. The lens 20 is movable in the direction of an optical axis by a lens driving section 51. The lens driving section 51 controls positions of the focusing lens based on focusing lens driving amount data outputted from the CPU 75. In addition, the lens driving section 51 controls positions of the zoom lens based on manipulation amount data of the zoom/upward/downward arrow lever included in the manipulation section 11.

In addition, an aperture 54 is driven by an aperture driving section 55 made up of a motor and a motor driver. The aperture driving section 55 adjusts an aperture diameter based on aperture value data outputted from the CPU 75.

An image pickup device (CCD image sensor) 58 is disposed posteriorly to an imaging optical system including the lens 20 and the aperture 54. As the image pickup device 58, a CMOS image sensor can be used in place of the CCD image sensor.

The image pickup device 58 has a photoelectric surface on which a large number of light receiving elements are arranged two-dimensionally. A subject light having passed through the photographic optical system is formed on the photoelectric surface to be subjected to photoelectric conversion. A microlens array for collecting light to each pixel, and a color filter array in which filters of the respective colors of R, G, and B are regularly arranged, are disposed anteriorly to the photoelectric surface. The image pickup device 58 outputs, line by line, electrical charges accumulated in each pixel as serial analog photographic signals in synchronization with a vertical transfer clock and a horizontal transfer clock supplied from an image pickup device control section 59. The period of time over which an electrical charge is accumulated in each pixel or, in other words, an exposure time is determined by an electronic shutter driving signal provided from the image pickup device control section 59. In addition, a gain of the image pickup device 58 is adjusted by the image pickup device control section 59 so that analog photographic signals of a predetermined size can be acquired.

An analog photographic signal loaded from the image pickup device 58 is inputted to an analog signal processing section 60. The analog signal processing section 60 is made up of a correlated double sampling (CDS) circuit that removes noise from an analog signal and an auto-gain controller (AGC) that adjusts the gain of an analog signal. The amplification gains of R, G, and B signals at the analog signal processing section 60 correspond to photographic sensitivity (ISO sensitivity). The CPU 75 sets photographic sensitivity by adjusting the amplification gains.

An A/D converting section 61 converts an analog image signal processed by the analog signal processing section 60 into digital image data. The image data converted into a digital signal is CCD-RAW data having R, G, and B concentration values for each pixel.

By multiplying or dividing an oscillation signal supplied from an oscillator (not shown) to generate a timing signal and by inputting the timing signal into the image pickup device control section 59, the control circuit 74 adjusts the timings of electrical charge introduction from the image pickup device 58 and processing of the analog signal processing section 60 upon manipulation of the shutter button of the manipulation section 11.

The control circuit 74 performs photometry by detecting a luminance of an image signal generated by the image pickup device 58. When the luminance of field is low, the control circuit 74 instructs a fill light control section 25 during automatic focus (AF) adjustment (upon half-press of the shutter button) to cause fill light to be radiated from a fill light emitting section 26 (e.g., LED).

Respective image data (CCD-RAW data) of R, G, and B outputted from the A/D converting section 61 is subjected to white balance (WB) adjustment, gamma correction, and YC processing by a digital signal processing section 65. Processed image data is written into a memory 66.

The memory 66 is a work memory to be used when performing various digital image processing (signal processing), to be described later, on image data. For example, an SDRAM (Synchronous Dynamic Random Access Memory) that performs data transfer in synchronization with a constant-cycle bus clock signal is used as the memory 66.

The display section 71 includes, for example, a liquid crystal monitor, and causes the liquid crystal monitor to display image data successively stored in the memory 66 after the photographic mode is set until an actual photography instruction is issued as a live view image (through image) for enabling a user to confirm view angle, photographic situation, and the like and to display image data saved in the recording section 70 during playback mode. Through images are to be photographed at predetermined time intervals by the image pickup device 58 while the photographic mode is being selected.

When the operating mode is set to the photographic mode, the digital camera 1 according to the present embodiment starts imaging of an image, whereby a live view image (through image) is displayed on the liquid crystal monitor of the display section 71. During live view display, the CPU 75 executes continuous AE (CAE) and continuous AF (CAF) based on computational results by the AF processing section 62 and an AE/AWB processing section 63 to be described later. In this case, continuous AE refers to a function for repetitively computing exposure values when live view photography is in progress and continuously controlling the electronic shutter function of the image pickup device (CCD) 58 and/or the aperture 54. Continuous AF refers to a function for repetitively computing AF evaluated values when live view photography is in progress and continuously controlling the positions of the focusing lens. When the shutter button is pressed halfway during the photographic mode (S1-on), the digital camera 1 executes AE processing (S1 AE) and AF processing (S1 AF), and executes AE lock and AF lock.

AE processing and AF processing will be described below. An image signal outputted from the image pickup device 58 is subjected to A/D conversion and subsequently inputted to the AF processing section 62 and the AE/AWB processing section 63 via a buffer memory (not shown).

The AE/AWB processing section 63 divides a screen into a plurality of segmented areas (for example, 8×8 or 16×16), integrates R, G, and B signals for each segmented area, and provides the CPU 75 with the integrated values. Based on the integrated values obtained from the AE/AWB processing section 63, the CPU 75 detects a brightness of the subject (subject luminance) and calculates an exposure value (photographic EV value) appropriate for photography. The CPU 75 determines an aperture value and a shutter speed according to the exposure value and a predetermined program diagram, and based on the aperture value and the shutter speed, controls the electronic shutter function of the image pickup device 58 and the aperture 54 to obtain an appropriate exposure amount.

Furthermore, the CPU 75 sends a command to a flash control section 73 and operates the same when a flash emitting mode is set to "on". The flash control section 73 includes a main capacitor for supplying current for activating a flash emitting section (electrical discharge tube) 24, and according to a flash emitting instruction from the CPU 75, performs charge control of the main capacitor and control of the discharge (emission) timing to the flash emitting section 24 and the discharge duration. Moreover, an light emitting diode (LED) can be used in place of the discharge tube as the flash emitting device.

In addition, the AE/AWB processing section 63 calculates an per-color average integrated value of R, G, and B signals for each segmented area during automatic white balance adjustment, and provides the CPU 75 with the calculation results thereof. Having obtained an R integrated value, a B integrated value, and a G integrated value, the CPU 75 calculates an R/G ratio and a B/G ratio for each segmented area, performs light source type discrimination based on the distribution of the RIG and B/G values in a color space with R/G and B/G-axial coordinates and the like, and controls gain values (white balance gain) with respect to the R, G, and B signals of a white balance adjusting circuit in accordance with the discriminated light source type to apply correction to the respective color channel signals.

For AF control in the digital camera 1 according to the present embodiment, contrast AF is applied in which the focusing lens is moved so that, for example, a high-frequency component of the G signal of the image signal becomes a local maximum. That is, the AF processing section 62 is made up of: a high pass filter that passes only the high-frequency component of the G signal; an absolute value calculation processing section; an AF area extracting section that extracts a signal within a focus target area set in advance in the screen (for example, the center of the screen); and an integrating section that integrates absolute value data within the AF area.

Integrated value data calculated by the AF processing section 62 is notified to the CPU 75. The CPU 75 computes focus evaluated values (AF evaluated values) at a plurality of AF detection points while controlling the lens driving section 51 and moving the focusing lens, and determines a lens position where the computed focus evaluated value becomes a local maximum to be an in-focus position. In addition, the CPU 75 controls the lens driving section 51 to move the focusing lens to the in-focus position. Moreover, during continuous AF (CAF), an in-focus position search range (the range of movement of the focusing lens during AF search) is narrower and the number of AF detection points is smaller compared to during S1 AF. In addition, computation of AF evaluated values is not limited to a mode that uses a G signal, and a luminance signal (Y signal) can be used instead.

Exposure and white balance can be set by manual manipulation by a user of the digital camera 1 when the photographic mode is set to a manual mode. In addition, even when exposure and white balance have been set automatically, the user is able to manually adjust exposure and white balance by issuing an instruction from the manipulation section 11 including the menu/OK button.

When the shutter button is first halfway pressed (S1-on) and then fully pressed (S2-on), actual image data for recording is loaded from the image pickup device 58. The actual image data refers to image data loaded from the image pickup device 58 during actual photography that is executed when the shutter button is fully pressed and stored in the memory 66 via the analog signal processing section 60, the A/D converting section 61, and the digital signal processing section 65. On the image data of an actual image, the digital signal processing section 65 performs image quality correction processing such as gamma correction, sharpness correction, and contrast correction, as well as YC conversion processing in which CCD-RAW data is converted into YC data made up of Y data that is a luminance signal, Cb data that is a blue color-difference signal, and Cr data that is a red color-difference signal. While an upper limit of the number of pixels in an actual image is determined by the number of pixels of the image pickup device 58, for example, the number of recording pixels may be changed by settings such as fine and normal. Meanwhile, the pixels of a live view and an image (a pre-image) during half-press of the shutter button are to be loaded with a smaller number of pixels than an actual image, such as with around 1/16 the number of pixels of an actual image.

In addition, the digital signal processing section 65 calculates the luminance of a face area in an actual image when the amount of emission of the flash emitting section 24 is set smaller than during normal photography, and performs processing for adjusting the luminance of the face area to take a predetermined threshold Th1 when the luminance is smaller than the threshold Th1.

A compression/expansion processing section 67 performs, for example, compression processing in a predetermined compression format on image data of an actual image already subjected to correction/conversion processing to generate an image file. The image file is recorded in the recording section 70. A tag storing collateral information such as the time and date of photography is added to the image file based on, for example, the Exif format or the like. In addition, during the playback mode, the compression/expansion processing section 67 performs expansion processing on image files read out from the recording section 70. Expanded image data is to be displayed on the liquid crystal monitor of the display section 71.

A face detection processing section 80 includes an image matching section and a face image template, detects a human face from a live view, a pre-image, or an actual image, and outputs information on the position and size of the face to the control circuit 74.

Specifically, the image matching section of the face detection processing section 80 matches an image of a target area with the face image template while moving the position of the target area within a screen of a live view or the like to examine the correlation therebetween. When the correlation score exceeds a preset threshold, the target area is recognized as a face area. When a face is not detected, the processing described above is repetitively performed while varying the size of the subject area. Moreover, usable face detection methods include known methods such as detecting, as a face area, an area having facial characteristics included in a face (for example, having a skin-colored area, having a black area (eye) inside a skin-colored area, having a skin-colored area whose shape is that of a face, or the like).

<Photographic Control>

Figure 2:
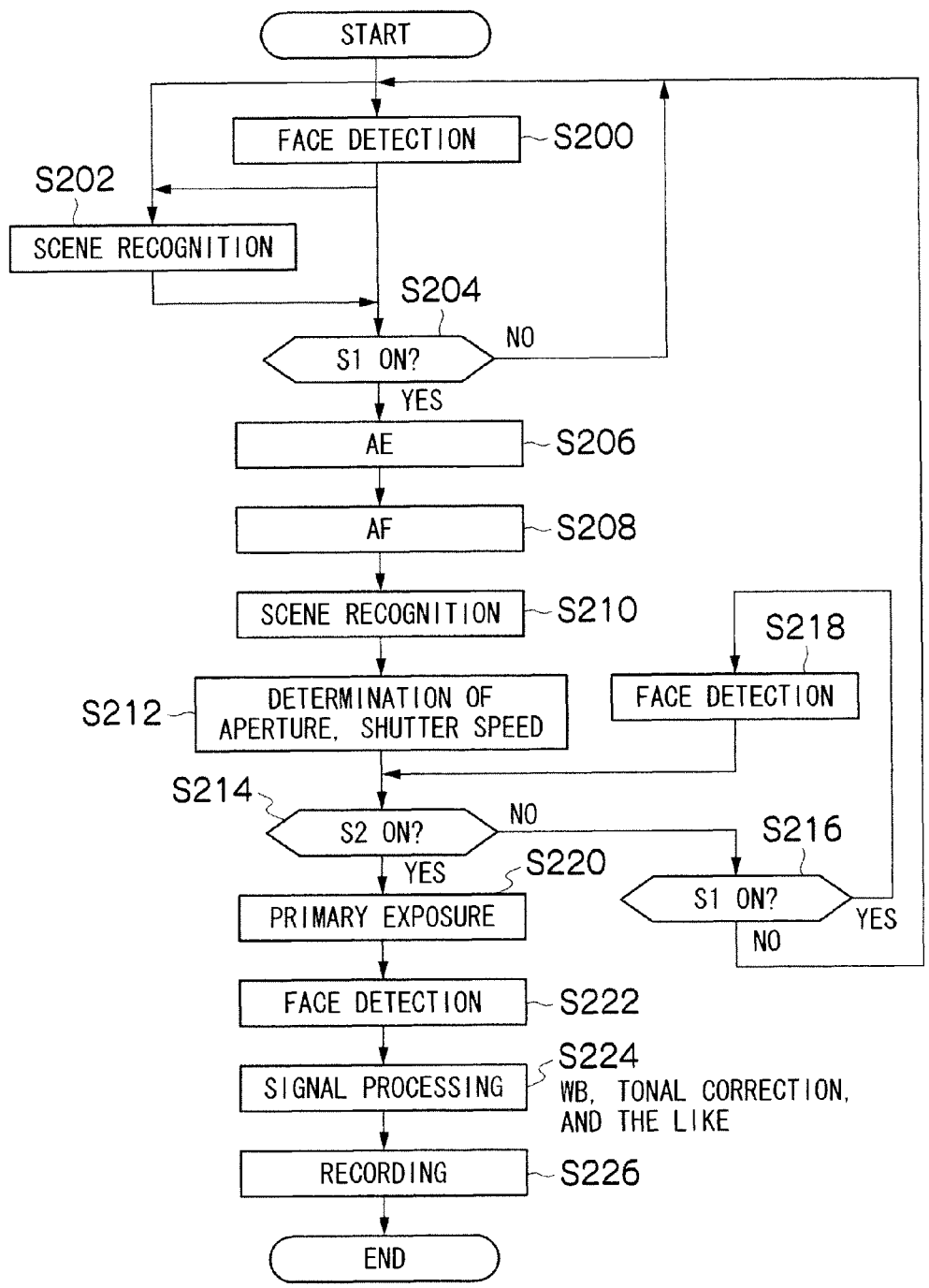
FIG. 2 is a flowchart showing an overview of an imaging method according to the present invention.

FIG. 2 is a flowchart showing an overview of an imaging method according to the present invention.

As shown in FIG. 2, the digital camera 1 according to the present embodiment repetitively performs face detection processing (step S200) and scene recognition processing (step S202) until the shutter button is pressed halfway (S1-on) (step S204). Details of the face detection processing and the scene recognition processing will be provided later.

Figure 3:
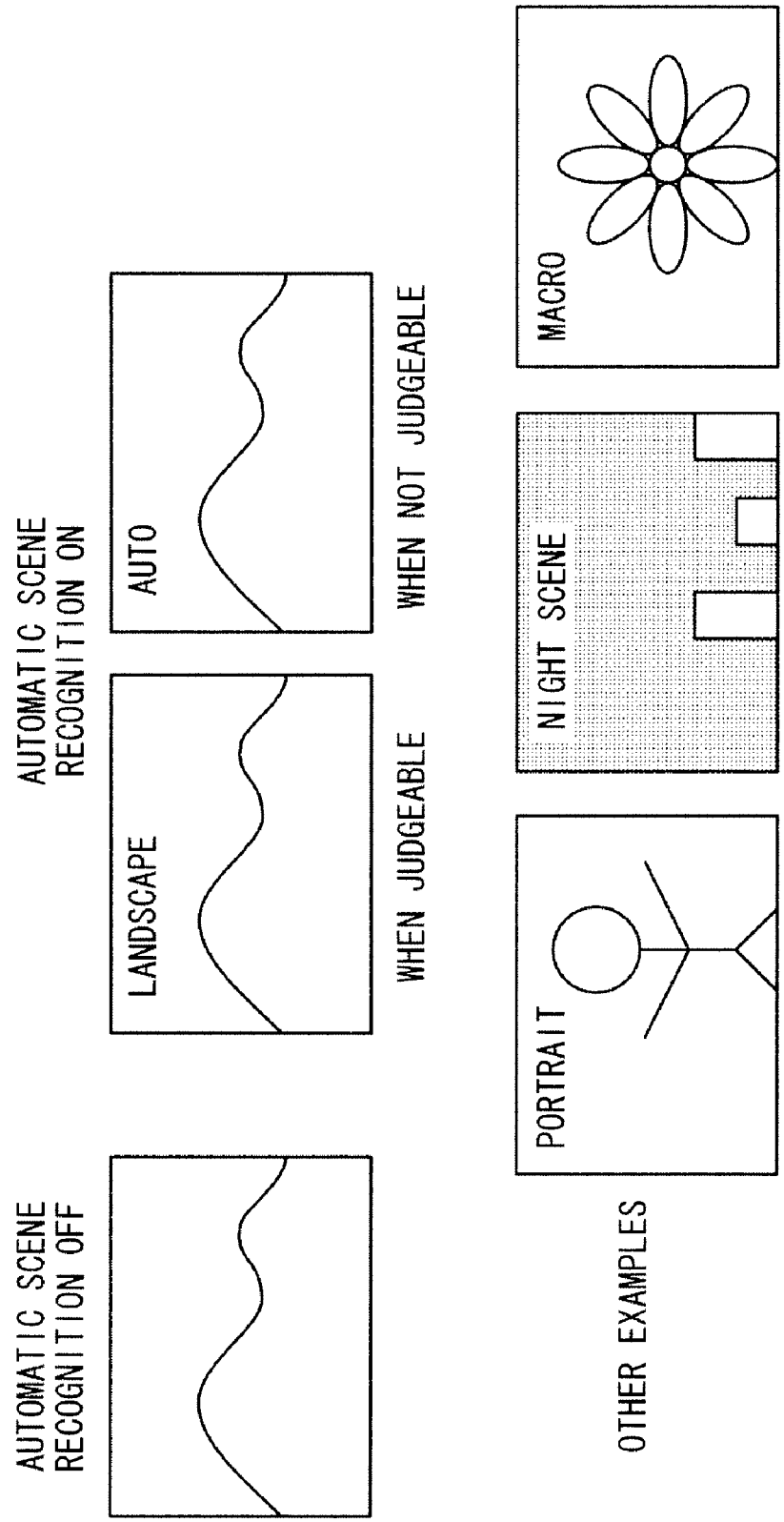
FIG. 3 is a diagram showing an example of a scene judgment result display.

Scene recognition is a technique for recognizing what kind of scene a user is attempting to photograph or has already photographed. Several scenes are to be defined in advance, and a recognition result is displayed on the display section 71. For example, as shown in FIG. 3, a scene recognition result such as "portrait", "landscape", "night scene", or "macro" is notified using a text or an icon display so as to be easily understood by the user. Moreover, "AUTO" is set as a recognition result when none of the defined scenes are applicable. In addition, nothing is to be displayed when automatic scene recognition is set to "OFF".

Here, it should be noted that while a face detection result is used in scene recognition, the timing at which a face detection result is updated is not necessarily consistent with the timing at which a scene recognition result is updated. In other words, face detection processing and scene recognition processing proceed independent from each other and the execution of scene recognition is not premised on a face detection result being updated. Furthermore, as shown in the flowchart in FIG. 2, it is also possible to detect a face at an entirely different timing from scene recognition. For example, it is possible to finalize scene recognition before primary exposure (step S220) but execute face detection after primary exposure (refer to step S222).

As shown, a relationship in which the results of face detection and scene recognition are the same does not always exist ("face is detected"="portrait mode" does not always hold true).

Therefore, by individually controlling the control methods of various functions using face detection according to scene recognition results as will be described later, a camera with superior capabilities can be achieved.

In S204, half-press of the shutter button (S1-on) is discriminated. When "Yes", the processing transitions to S206, and when "No", the processing returns to start.

In S206, AE processing (S1 AE) is performed and in S208, AF processing (S1 AF) is performed to respectively result in AE lock and AF lock.

In S210, scene recognition is performed in the same manner as in S202, with the sole difference being that S210 uses results of S1 AE and S1 AF while S202 uses results of CAE and CAF.

In S212, in accordance with the scene recognition result in S210, a program diagram suitable for the scene is selected, and based on the selected program diagram and an S1 AE photometry result (EV value) in S206, an aperture value and a shutter speed are determined.

In S214, full-press of the shutter button (S2-on) is discriminated. When "Yes", the processing transitions to S220, and when "No", the processing transitions to S216.

In S216, half-press of the shutter button (S1-on) is discriminated. When "Yes", the processing transitions to S218 to perform face detection processing. When "No", the processing returns to start.

In S220, primary exposure is performed based on the aperture value and the shutter speed determined in S212 and imaging of an actual image is performed.

In S222, face detection processing is performed on the actual image. In S224, signal processing including white balance processing and tonal correction such as gamma correction is performed on the actual image.

In S226, the actual image after being subjected to signal processing is compressed in a predetermined format to generate an image file, and the image file is recorded into the recording section 70.

Next, an embodiment will be described in which various functions are controlled based on a scene recognition result and a face detection result.

An example of relationships among various function using scene detection results and face detection are shown in FIG. 4.

The example presented in FIG. 4 shows relationships among five scene recognition results and five types of control using face detection.

First, five types of control using face detection of "face frame display", "face AE", "face AF", "face AWB", and "face tonal correction" will be briefly described.

With "face frame display" control, when a face is detected by face detection processing while a live view image (through image) is being displayed (S200 in FIG. 2), a face frame enclosing the face area is displayed on the live view based on the position and the size of the detected face. Accordingly, the user is now able to determine whether a face is correctly detected or not. Moreover, an arrow or other symbols may be displayed instead of a face frame.

"Face AE" control performs exposure control for CAE and S1 AE based on face detection results. A photometric value (EV value) is determined based on the brightness of the area of the detected face to control exposure.

"Face AF" control performs automatic focus adjustment for CAF and S1 AF based on face detection results. The area of the detected face is set as an AF area to perform focus adjustment so that the AF area (face area) comes into focus.

"Face AWB" control performs white balance adjustment based on face detection results. White balance adjustment is performed so as to, for example, improve skin tone quality based on color information of the area of the detected face.

"Face tonal correction" control performs tonal correction of an image based on face detection results. Tonal correction including gamma correction and the like is performed so that the area of the detected face acquires an appropriate brightness.

In the example shown in FIG. 4, circles represent controls to be performed while crosses represent controls not to be performed. The controls of "face frame display", "face AE", and face "AF" are shown to always be performed regardless of the five scene recognition results of "AUTO", "portrait", "landscape", "night scene", and "macro".

On the other hand, the controls of "face AWB" and "face tonal correction" are performed only for the scenes of "AUTO", "portrait", and "macro", and are not performed for the scenes of "landscape" and "night scene".

Moreover, controls of the various functions based on scene recognition results and face detection results, as well as the types of controls using the types of scene recognition and face detection, are not limited to the example shown in FIG. 4, and many variations are conceivable.

Furthermore, while the various functions are arranged so as to be controlled on an ON/OFF basis, a mechanism is also possible in which the intensities of the various functions are classified into several levels and one of such levels is set (for example, "high, medium, and low", "levels 1 to 5", and the like).

As described above, scene recognition and face detection need not necessarily be performed at the same timing. To this end, while the example shown in FIG. 2 does not describe a step for performing scene recognition after primary exposure, such an arrangement is not specifically restrictive.

Therefore, by individually controlling the control methods of various functions using face detection according to scene recognition results as described above, a camera with superior capabilities can be achieved (capturing and creating high quality images, improving display visibility, facilitating image search and retrieval, and the like).

[Scene Recognition Processing]

Next, "scene recognition" performed in S200 and S210 shown in FIG. 2 (including "face detection" performed in S200, S218, and S222) will be described in detail.

Incidentally, "photographic scene recognition" (scene recognition) in the present invention means that the digital camera 1 recognizes a subject at the time of photographing is in a predetermined situation (photographic scene or scene), and photographic scenes to be recognized in the present embodiment include four scenes as stated above, i.e., "portrait", "landscape", "night scene", or "macro".

Figure 5:
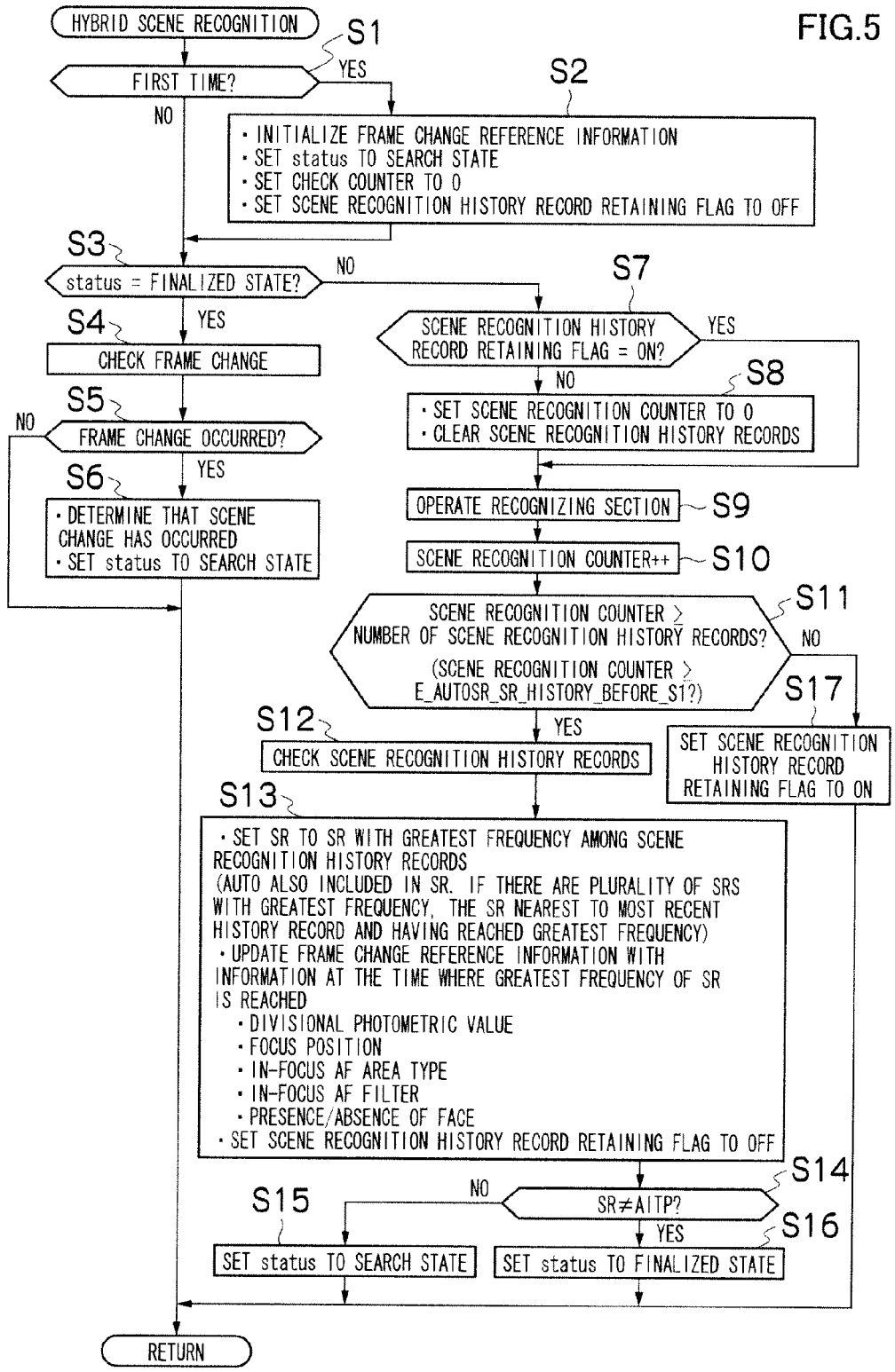
FIG. 5 is a flowchart of scene recognition main processing.

FIG. 5 is a flowchart of scene recognition main processing. Execution of the processing is controlled by the CPU 75 of the digital camera 1. A program defining the processing is stored in the ROM 68. The processing is started when a photographic mode has been set from the manipulation section 11 and, at the same time, "automatic scene recognition ON" has been set from the manipulation section 11. The processing does not start when "automatic scene recognition OFF" has been set from the manipulation section 11.

In S1, a determination is made on whether or not the processing is to be executed for the first time. If "Yes", the main processing proceeds to S2. If "No", the main processing proceeds to S3.

In S2, frame change reference information of the RAM 69 is initialized. The frame change reference information includes: a divisional photometric value; a focusing lens position; an in-focus AF area type (whether or not an AF area having entered a focused state is a face area detected by the face detection processing section 80 or a default area in the vicinity of the center of a screen); an in-focus AF filter (for example, the low-pass filter and the high-pass filter according to Japanese Patent Application Laid-Open No. 2006-145964); and the occurrence/nonoccurrence of face detection by the face detection processing section 80. In addition, "status" of the RAM 69 is set to a search state, a check counter is set to 0, and a scene recognition history record retaining flag is set to OFF.

In S3, a determination is made on whether or not "status" of the RAM 69 is a finalized state. If "Yes", the main processing proceeds to S4. If "No", the main processing proceeds to S7.

In S4, a frame change check is performed. This processing will be described later.

In S5, as a result of the frame change check, a determination is made on whether or not a frame change has occurred. If "Yes", the main processing proceeds to S6. If "No", the main processing returns to S1.

In S6, it is determined that a scene change has occurred, whereby "status" of the RAM 69 is set to a search state.

In S7, a determination is made on whether or not the scene recognition history record retaining flag of the RAM 69 is set to ON. If "Yes", the main processing proceeds to S9. If "No", the main processing proceeds to S8.

In S8, a scene recognition counter of the RAM 69 is set to 0. In addition, the scene recognition history records of the RAM 69 are cleared.

In S9, a scene recognition operation of a recognizing section is performed. This processing will be described later. As a result of this processing, a scene recognition result SR is stored in the RAM 69. The scene recognition result SR includes landscape, AUTO, portrait, night scene, macro, and the like. Details of processing for recognizing the respective scenes will be described later.

In S10, the scene recognition counter of the RAM 69 is incremented by 1.

In S11, the scene recognition counter of the RAM 69 and a predetermined threshold of the number of scene recognition history records (E_AUTOSR_SR_HISTORY_BEFORE_S1) of the ROM 68 are compared to determine whether or not "scene recognition counter≧threshold of the number of scene recognition history records" is true. If "Yes", the main processing proceeds to S12. If "No", the main processing proceeds to S17.

In S12, the scene recognition history records of the RAM 69 are checked. A scene recognition history record is made up of a plurality of scene recognition results SR respectively individually stored by repeating S9 until "status" reaches a finalized state.

In S13, the scene recognition result SR of the RAM 69 is updated to a scene recognition result SR having the greatest frequency of appearance among a scene recognition history record made up of a plurality of scene recognition results SR stored at different times in S9. In addition, the frame change information of RAM 69 is updated to frame change information acquired at the same time point as the scene recognition result SR having the greatest frequency of appearance.

In S14, a determination is made on whether or not the scene recognition result SR of the RAM 69 is different from "AUTO". If "Yes", the main processing proceeds to S16. If "No", the main processing proceeds to S15.

In S15, "status" of the RAM 69 is set to the search state and the main processing returns to S1.

In S16, "status" of the RAM 69 is set to the finalized state and the main processing returns to S1.

Figure 6:
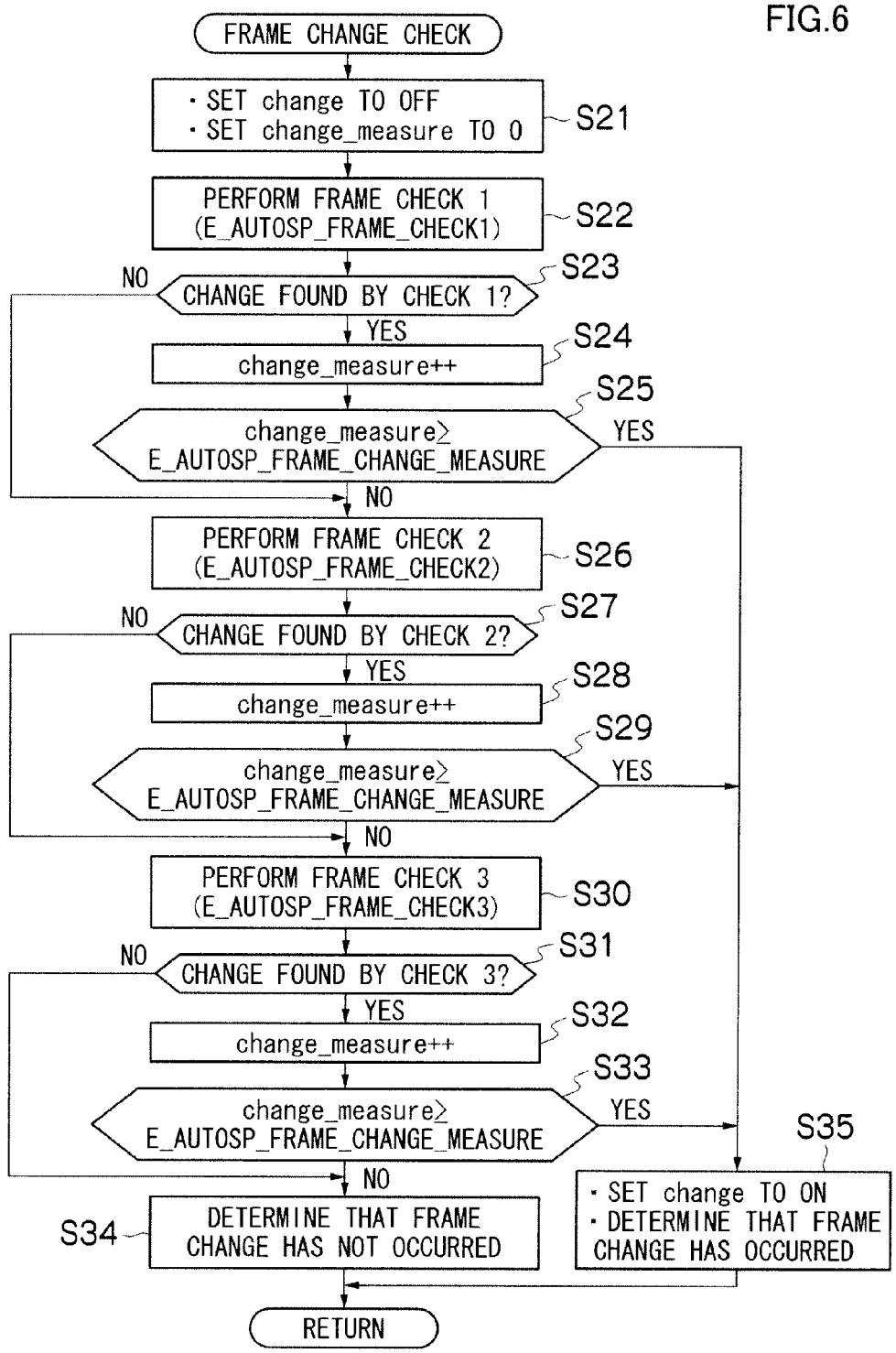
FIG. 6 is a flowchart of a frame change check.

FIG. 6 is a flowchart showing a detailed processing flow of the frame change check (S4). Execution of the processing is controlled by the CPU 75 of the digital camera 1. A program defining the processing is stored in the ROM 68.

In S21, parameters "change" and "change_measure" of the RAM 69 are set to OFF and 0, respectively.

In S22, a first frame change check is performed. In this case, while the frame change check is assumed to be any one of a photometric value change check, a focus position change check, and a face presence/absence change check, other types may be included instead. These processing will be described later. The result of the first frame change check is to be stored as E_AUTOSP_FRAME_CHECK1 that is a parameter of the RAM 69.

In S23, based on the result of the first frame change check in S22, a determination is made on whether or not a frame change has occurred. If "Yes", the processing proceeds to S24. If "No", the processing proceeds to S26.

In S24, change_measure of the RAM 69 is incremented by 1.

In S25, change_measure of the RAM 69 and a predetermined threshold E_AUTOSP_FRAME_CHANGE_MEASURE of the ROM 68 are compared to determine whether or not "change_measure≧E_AUTOSP_FRAME_CHANGE_MEASURE" is true. If "No", the processing proceeds to S26. If "Yes", the processing proceeds to S35.

In S26, a second frame change check is performed. In this case, the frame change check is assumed to be any one of a photometric value change check, a focus position change check, and a face presence/absence change check, and the second frame change check is the one which differs from the first frame check. The result of the second frame change check is to be stored as E_AUTOSP_FRAME_CHECK2 that is a parameter of the RAM 69.

In S27, based on the result of the second frame change check in S26, a determination is made on whether or not a frame change has occurred. If "Yes", the processing proceeds to S28. If "No", the processing proceeds to S30.

In S28, change_measure of the RAM 69 is incremented by 1.

In S29, change_measure of the RAM 69 and a threshold E_AUTOSP_FRAME_CHANGE_MEASURE stored in the ROM 68 are compared to determine whether or not "change_measure≧E_AUTOSP_FRAME_CHANGE_MEASURE" is true. If "No", the processing proceeds to S30. If "Yes", the processing proceeds to S35.

In S30, a third frame change check is performed. In this case, the frame change check is assumed to be any one of a photometric value change check, a focus position change check, and a face presence/absence change check which differs from the first and second frame checks. The result of the third frame change check is to be stored as E_AUTOSP_FRAME_CHECK3 that is a parameter of the RAM 69.

In S31, based on the result of the third frame change check in S30, a determination is made on whether or not a frame change has occurred. If "Yes", the processing proceeds to S32. If "No", the processing proceeds to S34.

In S32, change_measure of the RAM 69 is incremented by 1.

In S33, change_measure of the RAM 69 and a threshold E_AUTOSP_FRAME_CHANGE_MEASURE stored in the ROM 68 are compared to determine whether or not "change_measure≧E_AUTOSP_FRAME_CHANGE_MEASURE" is true. If "No", the processing proceeds to S34. If "Yes", the processing proceeds to S35.

In S34, it is determined that a frame change has not occurred. A flag indicating this determination may be stored in the RAM 69. The processing then returns to S5 of the scene recognition main processing.

In S35, it is determined that a frame change has occurred. "change" that is a flag of "frame change occurred" is set to ON and stored in the RAM 69. The processing then returns to S5 of the scene recognition main processing.

Figure 7:
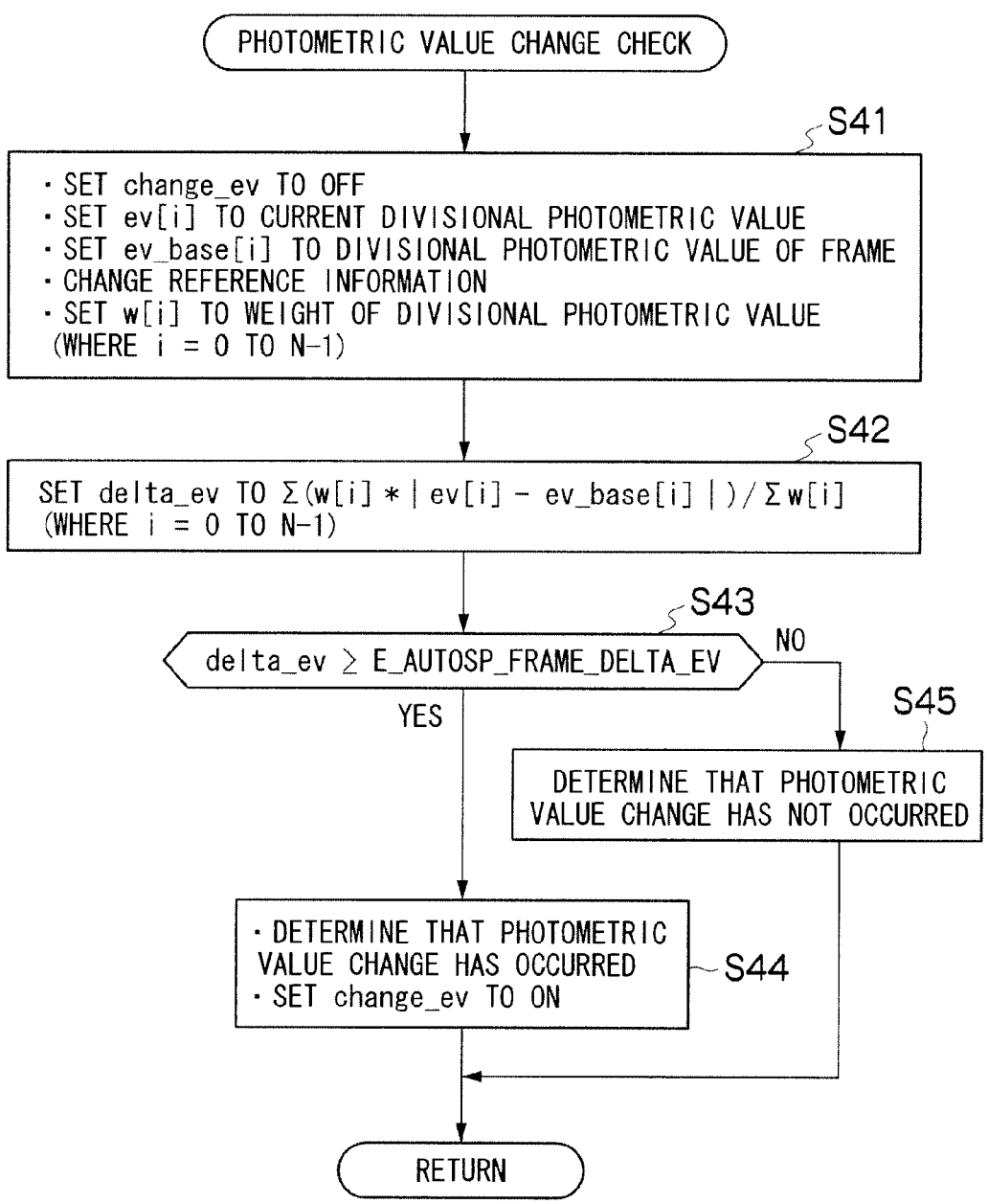
FIG. 7 is a flowchart of a photometric value change check.

FIG. 7 is a flowchart of a photometric value change check. Execution of the processing is controlled by the CPU 75 of the digital camera 1. A program defining the processing is stored in the ROM 68.

In S41, a parameter change_ev of the RAM 69 is set to OFF. In addition, a parameter ev[i] of the RAM 69 is set to a photometric value obtained from the photometry section 46 with respect to the current frame image. Reference character i designates a suffix corresponding to each of N=number of blocks obtained by dividing the image into predetermined units. In this case, it is assumed that i=0 to N−1.

In addition, a parameter ev_base[i] of the RAM 69 is set as a divisional photometric value of the frame change reference information and a value thereof is retained in the RAM 69. Moreover, ev_base[i] is initialized in S2 and updated in S13 of the main processing. In addition, a weight w[i] corresponding to each block is read from the ROM 68.

In S42, a parameter delta_ev is set to the RAM 69 according to the following equation. Summation is to be performed for i=0 to N−1. delta_ev may alternatively be a difference between brightnesses of the entire screen.

$$delta\_ev = \Sigma\{W[i]*|ev[i]-ev\_base[i]|\}/\Sigma W[i]$$

Summation is performed on absolute values of the differences of the respective areas because as follows. Absolute values are taken in order to prevent summation from cancelling out changes in the respective areas and eliminating change as a whole even when significant changes are actually occurring in the respective areas.

In S43, delta_ev of the RAM 69 and a threshold E_AUTOSP_FRAME_DELTA_EV stored in the ROM 68 is compared to determine whether or not delta_ev≧E_AUTOSP_FRAME_DELTA_EV is true. If "Yes", the processing proceeds to S44. If "No", the processing proceeds to S45.

In S44, it is determined that a change in the photometric value has occurred. A flag "change_ev" indicating that a change in the photometric value has occurred is set to ON and stored in the RAM 69.

In S45, it is determined that a change in the photometric value has not occurred. A flag indicating that a change in the photometric value has not occurred may be stored in the RAM 69.

Figure 8:
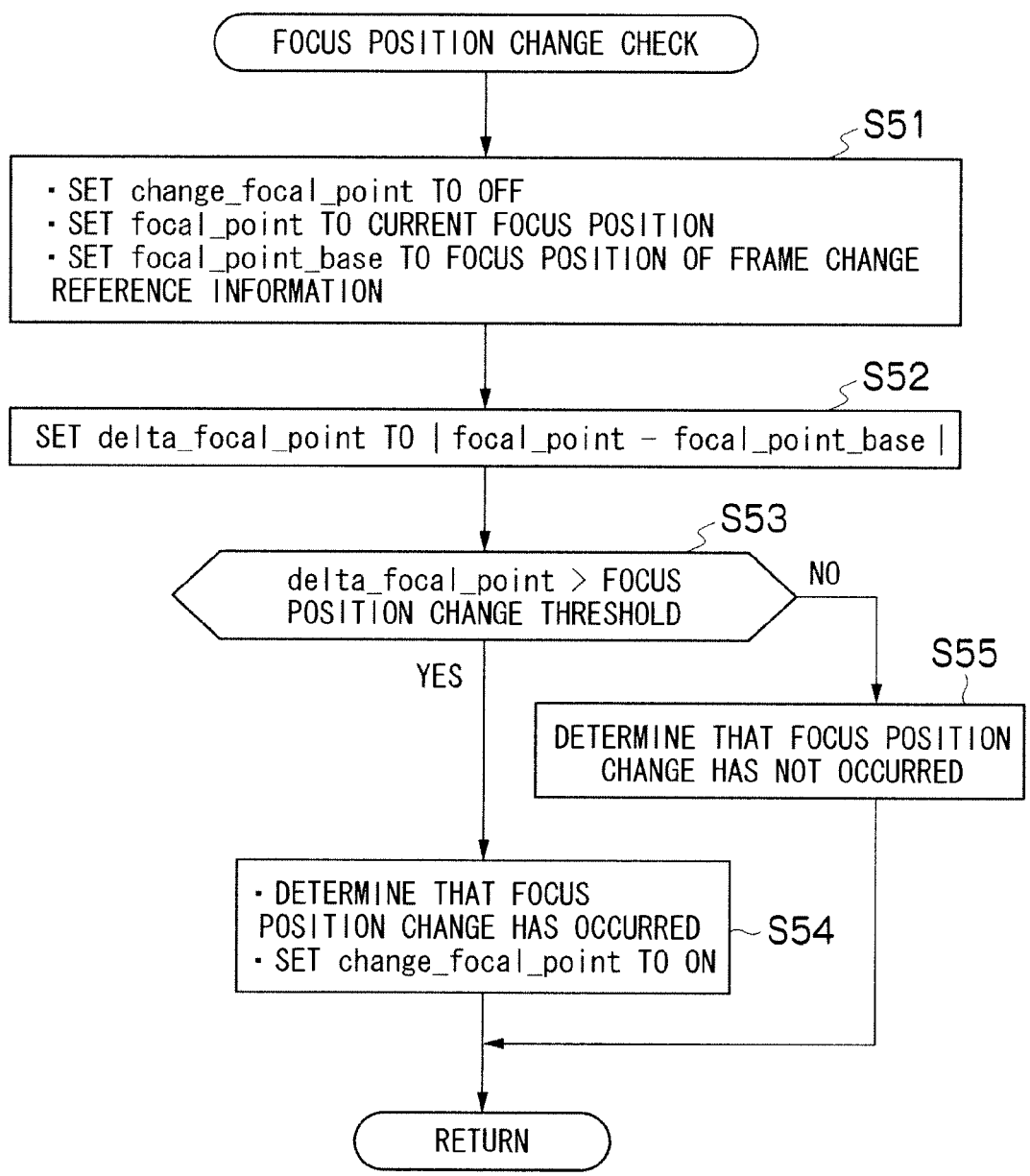
FIG. 8 is a flowchart of a focus position change check.

FIG. 8 is a flowchart of a focus position change check. Execution of the processing is controlled by the CPU 75 of the digital camera 1. A program defining the processing is stored in the ROM 68.

In S51, a parameter change_focal_point of the RAM 69 is set to OFF, a parameter focal_point of the RAM 69 is set to a focusing lens position (number of drive pulses) set by the lens driving section 51 when acquiring the current frame image, and a parameter focal_point_base of the RAM 69 is set to the focusing lens position (that is initialized in S2 or updated in S13) of the frame change reference information, whereby a storage area thereof is secured in the RAM 69.

In S52, delta_focal_point is set to the RAM 69 according to the following equation.

$$delta\_focal\_point = |focal\_point - focal\_point\_base|$$

In S53, delta_focal_point of the RAM 69 and a predetermined focus position change threshold stored in the ROM 68 are compared to determine whether or not delta_focal_point>focus position change threshold is true. If "Yes", the processing proceeds to S54. If "No", the processing proceeds to S55.

In S54, it is determined that a change in focus position has occurred. Subsequently, a flag change_focal_point indicating that a change in focus position has occurred is set to ON and stored in the RAM 69.

In S55, it is determined that a change in focus position has not occurred. A flag indicating that a change in focus position has not occurred may be stored in the RAM 69.

Figure 9:
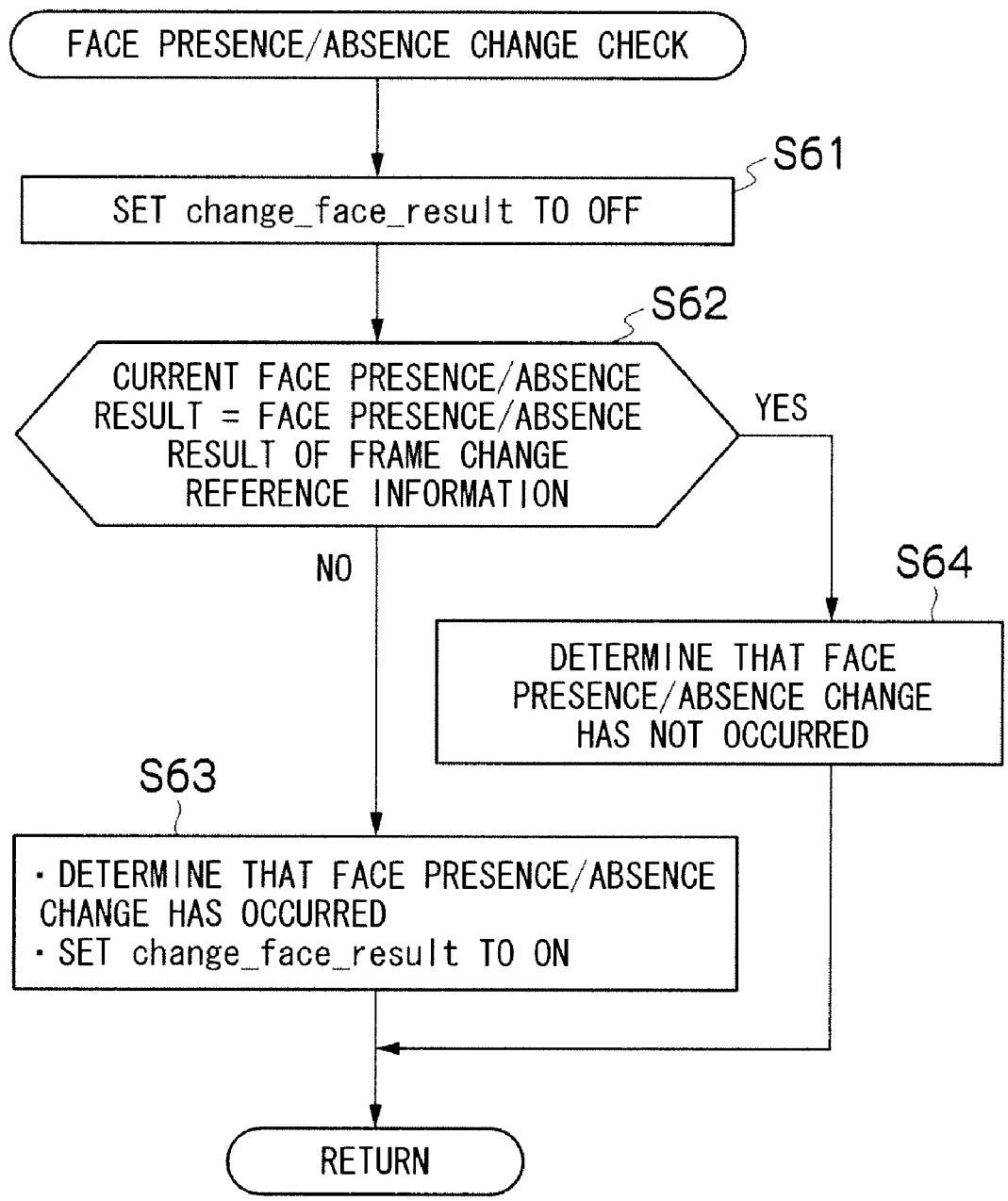
FIG. 9 is a flowchart of a face presence/absence change check.

FIG. 9 is a flowchart of a face presence/absence change check. Execution of the processing is controlled by the CPU 75 of the digital camera 1. A program defining the processing is stored in the ROM 68.

In S61, a parameter change_face_result of the RAM 69 is set to OFF.

In S62, a determination is made on whether or not "the occurrence/nonoccurrence of face detection outputted by the face detection processing section 80 when the current frame image had been acquired" is consistent with "the occurrence/nonoccurrence (that is initialized in S2 or updated in S13) of face detection of the frame change reference information". If "Yes", the processing proceeds to S64. If "No", the processing proceeds to S63.

In S63, it is determined that a change in the occurrence/nonoccurrence of face detection has occurred. A flag "change_face_result" indicating that a change in the occurrence/nonoccurrence of face detection has occurred is set to ON and stored in the RAM 69.

In S64, it is determined that a change in the occurrence/nonoccurrence of face detection has not occurred. A flag indicating that a change in the occurrence/nonoccurrence of face detection has not occurred may be stored in the RAM 69.

Figure 10:
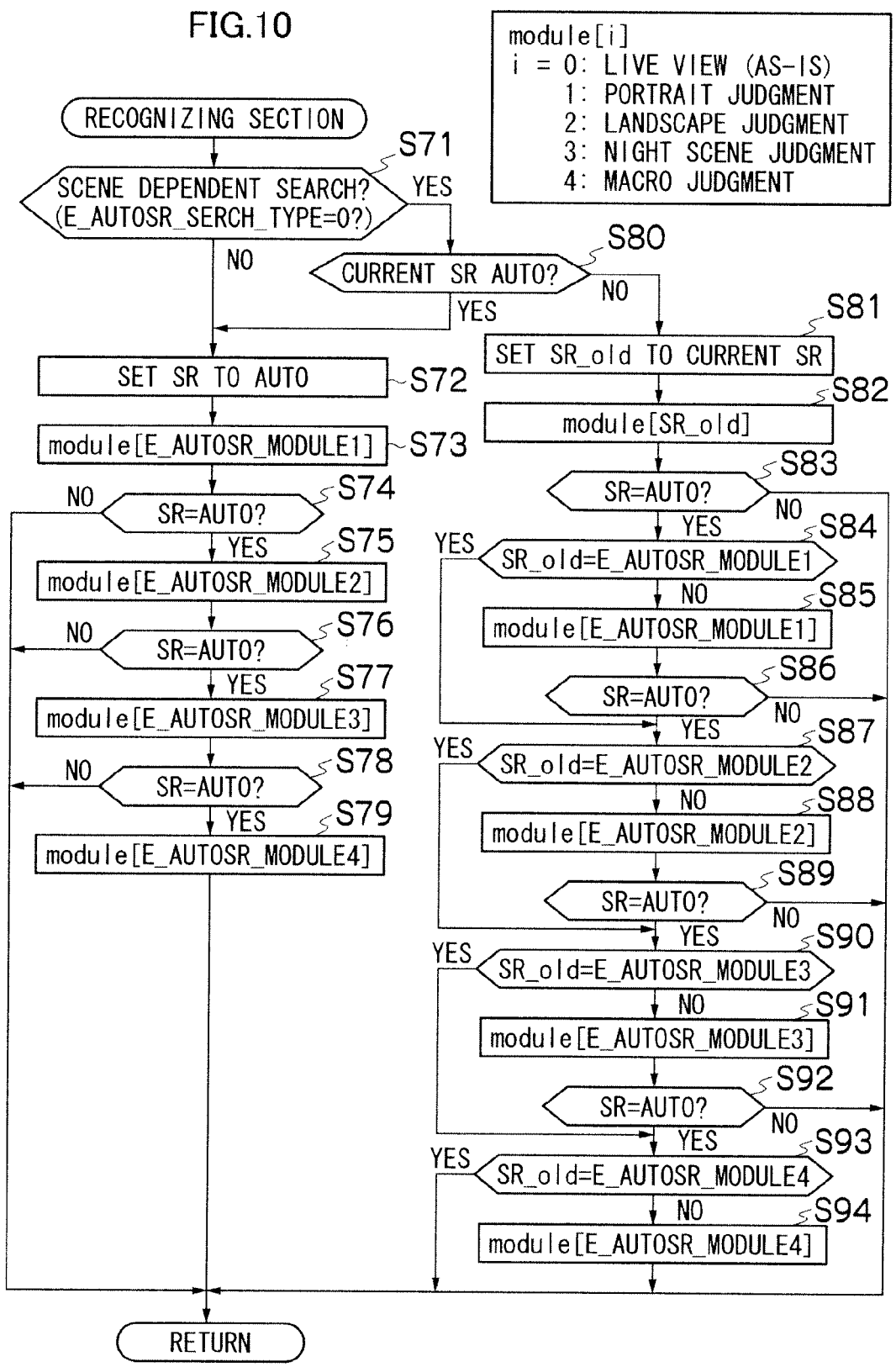
FIG. 10 is a flowchart showing details of scene recognition.

FIG. 10 is a flowchart showing details of a scene recognition operation (S9) of the recognizing section. Execution of the processing is controlled by the CPU 75 of the digital camera 1. A program defining the processing is stored in the ROM 68.

In S71, a determination is made on whether or not a flag (E_AUTOSR_SEARCH_TYPE) for carrying out a scene-dependent search (processing in S80 or later) and which is stored in the RAM 69 is set to 0. If "Yes", the operation proceeds to S80. If "No", the operation proceeds to S72. The value of E_AUTOSR_SEARCH_TYPE is assumed to be arbitrarily settable from the manipulation section 11.

In S72, AUTO is set to the scene recognition result SR of the RAM 69.

In S73, E_AUTOSR_MODULE1 stored in advance in the ROM 68 is substituted into parameter i of the RAM 69. E_AUTOSR_MODULE1 is any integer from 0 to 4. Subsequently, a scene judgment (a scene recognition; hereinafter same) subroutine corresponding to module[i] is carried out. module[0] performs nothing. module[1] performs a portrait judgment to be described later. module[2] performs a landscape judgment to be described later. module[3] performs a night scene judgment to be described later. module[4] performs a macro judgment to be described later.

In S74, based on the result of carrying out module[i] in S73, a determination is made on whether or not the scene recognition result SR of the RAM 69 is AUTO. If "Yes", the operation proceeds to S75. If "No", the operation returns to S10 of the main processing.

In S75, E_AUTOSR_MODULE2 stored in advance in the ROM 68 is substituted into parameter i of the RAM 69. E_AUTOSR_MODULE2 is any integer from 0 to 4 which is different from E_AUTOSR_MODULE1. Subsequently, a scene judgment subroutine corresponding to module[i] is carried out.

In S76, based on the result of carrying out module[i] in S75, a determination is made on whether or not the scene recognition result SR of the RAM 69 is AUTO. If "Yes", the operation proceeds to S77. If "No", the operation returns to S10 of the main processing.

In S77, E_AUTOSR_MODULE3 stored in advance in the ROM 68 is substituted into parameter i of the RAM 69. E_AUTOSR_MODULE3 is any integer from 0 to 4 which is different from both E_AUTOSR_MODULE1 and E_AUTOSR_MODULE2. Subsequently, a scene judgment subroutine corresponding to module[i] is carried out.

In S78, based on the result of carrying out module[i] in S77, a determination is made on whether or not the scene recognition result SR of the RAM 69 is AUTO. If "Yes", the operation proceeds to S79. If "No", the operation returns to S10 of the main processing.

In S79, E_AUTOSR_MODULE4 stored in advance in the ROM 68 is substituted into parameter i of the RAM 69. E_AUTOSR_MODULE3 is any integer from 0 to 4 which is different from E_AUTOSR_MODULE1, E_AUTOSR_MODULE2, and E_AUTOSR_MODULE3. Subsequently, a scene judgment subroutine corresponding to module[i] is carried out. While values of E_AUTOSR_MODULE1, E_AUTOSR_MODULE2, E_AUTOSR_MODULE3, and E_AUTOSR_MODULE4 may be set in any way, a small number is preferably attached to the type for which a scene judgment is desirably preferentially performed. For example, when it is desirable to perform scene judgment in an order of portrait judgment>landscape judgment>night scene judgment>macro judgment, then E_AUTOSR_MODULE1=1, E_AUTOSR_MODULE2=2, E_AUTOSR_MODULE3=3, and E_AUTOSR_MODULE4=4 shall suffice. These values may alternatively be arranged so as to be arbitrarily settable from the manipulation section 11.

In S80, a determination is made on whether or not the current scene recognition result SR of the RAM 69 is AUTO. If "Yes", the operation proceeds to S72. If "No", the operation proceeds to S81.

In S81, the current scene recognition result SR of the RAM 69 is set to a parameter SR_old of the RAM 69. In other words, if the current scene recognition result SR of the RAM 69 is AUTO then SR_old=0, if the current scene recognition result SR of the RAM 69 is portrait then SR_old=1, if the current scene recognition result SR of the RAM 69 is landscape then SR_old=2, if the current scene recognition result SR of the RAM 69 is night scene then SR_old=3, and if the current scene recognition result SR of the RAM 69 is macro then SR_old=4.

In S82, SR_old is substituted into the parameter i of the RAM 69. Subsequently, a scene judgment subroutine corresponding to module[i] is carried out.

In S83, based on the result of carrying out module[i] in S82, a determination is made on whether or not the scene recognition result SR of the RAM 69 is AUTO. If "Yes", the operation proceeds to S84. If "No", the operation returns to S10 of the main processing.

In S84, a determination is made on whether or not SR_old=E_AUTOSR_MODULE1. If "Yes", the operation proceeds to S87. If "No", the operation proceeds to S85.

In S85, E_AUTOSR_MODULE1 stored in advance in the ROM 68 is substituted into parameter i of the RAM 69. Subsequently, a scene judgment subroutine corresponding to module[i] is carried out.

In S86, based on the result of carrying out module[i] in S85, a determination is made on whether or not the scene recognition result SR of the RAM 69 is AUTO. If "Yes", the operation proceeds to S87. If "No", the operation returns to S10 of the main processing.

In S87, a determination is made on whether or not SR_old=E_AUTOSR_MODULE2. If "Yes", the operation proceeds to S90. If "No", the operation proceeds to S88.

In S88, E_AUTOSR_MODULE2 stored in advance in the ROM 68 is substituted into parameter i of the RAM 69. Subsequently, a scene judgment subroutine corresponding to module[i] is carried out.

In S89, based on the result of carrying out module[i] in S88, a determination is made on whether or not the scene recognition result SR of the RAM 69 is AUTO. If "Yes", the operation proceeds to S90. If "No", the operation returns to S10 of the main processing.

In S90, a determination is made on whether or not SR_old=E_AUTOSR_MODULE3. If "Yes", the operation proceeds to S93. If "No", the operation proceeds to S91.

In S91, E_AUTOSR_MODULE3 stored in advance in the ROM 68 is substituted into parameter i of the RAM 69. Subsequently, a scene judgment subroutine corresponding to module[i] is carried out.

In S92, based on the result of carrying out module[i] in S91, a determination is made on whether or not the scene recognition result SR of the RAM 69 is AUTO. If "Yes", the operation proceeds to S93. If "No", the operation returns to S10 of the main processing.

In S93, a determination is made on whether or not SR_old=E_AUTOSR_MODULE4. If "Yes", the processing returns to S10 of the main processing. If "No", the operation proceeds to S94.

In S94, E_AUTOSR_MODULE4 stored in advance in the ROM 68 is substituted into parameter i of the RAM 69. Subsequently, a scene judgment subroutine corresponding to module[i] is carried out. The processing then returns to S10 of the main processing.

Figure 11:
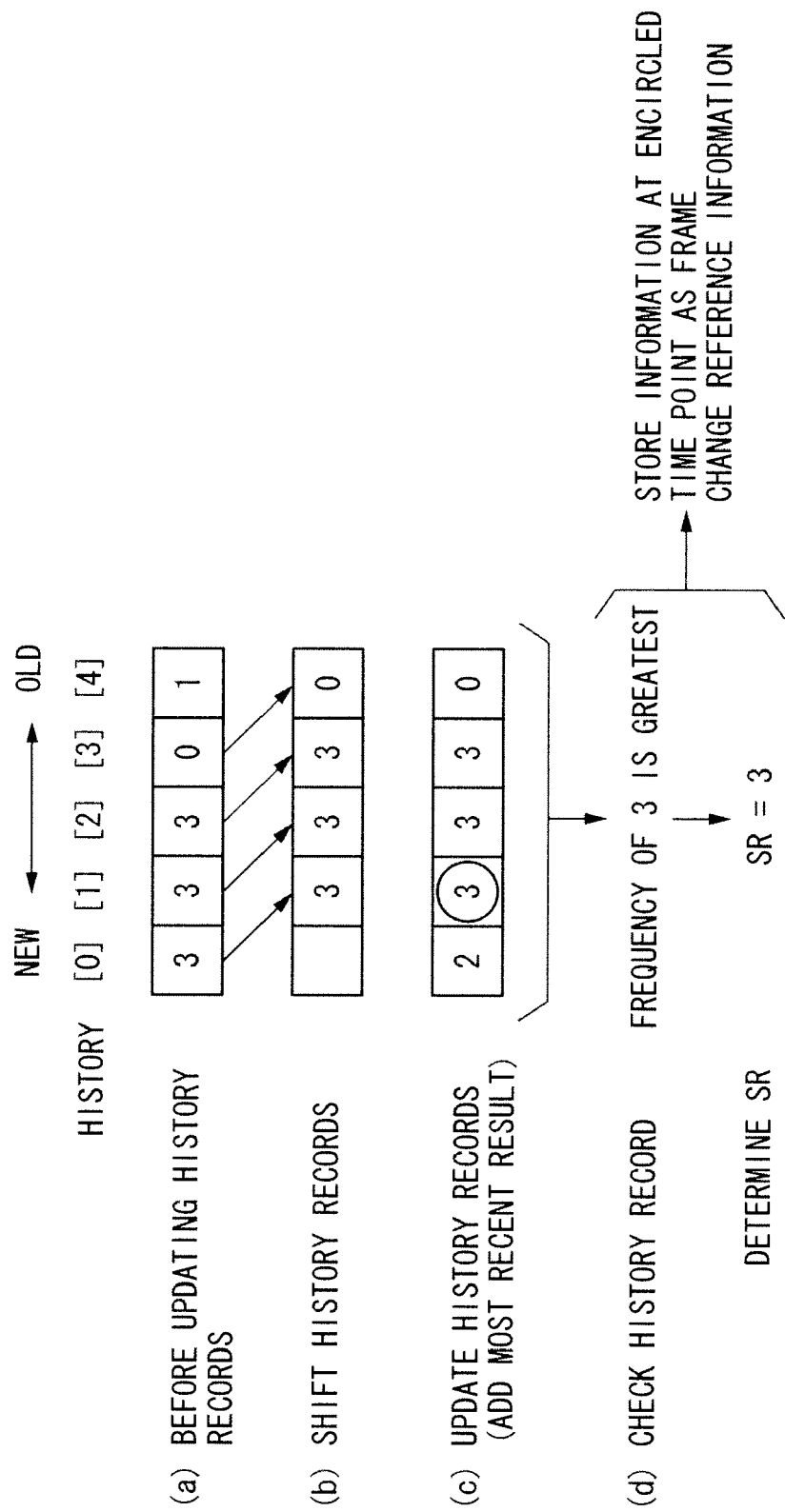
FIG. 11 is a diagram conceptually showing a scene recognition result SR.

FIG. 11 conceptually shows scene recognition results SR determined by the processing (S9) described above and by S13.

Five scene recognition results SR are successively stored from the oldest to the newest. A suffix j=0 to 4 is attached to the history records SR, where the smaller the number, the more recent the history record. A case where the number of accumulated history records is 5 is merely an example and any integer equal to or greater than 3 shall suffice.

Each time module[i] is executed in S73, S75, S77, and S79 or in S85, S88, S91, and S94, a new scene recognition result SR is acquired. As a result, the suffixes of previous scene recognition results SR accumulated up to then are incremented by 1 and the previous scene recognition results SR become history records of one generation older. The new scene recognition result SR is attached with a suffix of 0 to become a current scene recognition result.

In FIG. 11, what was SR[0]=3, SR[1]=3, SR[2]=3, SR[3]=0, and SR[4]=1 becomes SR[1]=3, SR[2]=3, SR[3]=3, and SR[4]=0 as a result of the addition of a new history record SR[0]=2. Prior to the addition of the new history record SR[0], the history record of the oldest generation SR[4]=1 may either be deleted from or stored in the RAM 69 upon the addition of the new history record.

In S13, when a new history record is added, a history record with the highest frequency of appearance among SR[0], SR[1], SR[2], SR[3], and SR[4] is identified and re-assumed to be the scene recognition result SR. In FIG. 8, since 3 has the greatest frequency of appearance, SR=3.

Although not shown, when there are a plurality of history records which share the greatest frequency of appearance, the history record of the newest generation is assumed to be the scene recognition result SR. For example, in the case of SR[0]=2, SR[1]=3, SR[2]=3, SR[3]=2, and SR[4]=0, since SR[0]=SR[3]=2 and SR[1]=SR[2]=3, 2 and 3 have the same frequency of appearance. In this case, 2 including the newest generation history record SR[0] becomes the scene recognition result SR.

Figure 12:
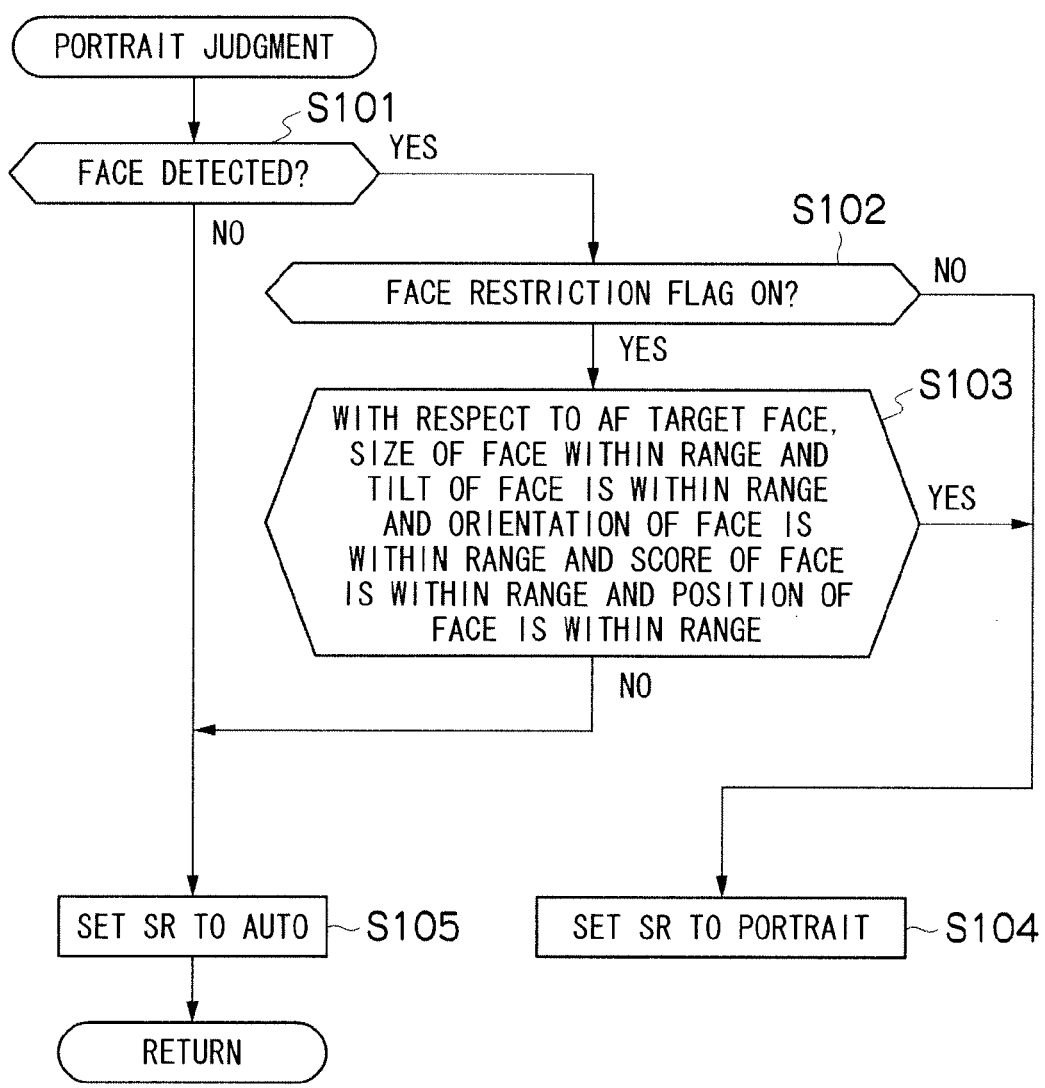
FIG. 12 is a flowchart of a scene judgment subroutine (portrait judgment)

FIG. 12 is a flowchart showing details of a scene judgment subroutine (portrait judgment, module[1]). Execution of the processing is controlled by the CPU 75 of the digital camera 1. A program defining the processing is stored in the ROM 68.

In S101, a determination is made on whether or not the face detection processing section 80 has detected a face. If "Yes", the subroutine proceeds to S102. If "No", the subroutine proceeds to S105.

In S102, a determination is made on whether or not a face limitation flag of the RAM 69 is turned on. If "Yes", the subroutine proceeds to S103. If "No", the subroutine proceeds to S104.

In S103, with respect to a face area set in an AF evaluated value calculation area, a determination is made on: whether or not the size of the face is within a predetermined range; the tilt of the face is within a predetermined range; the orientation of the face is within a predetermined range; the accuracy score of the face is within a predetermined range; and the position of the face is within a predetermined range. If "No", the subroutine proceeds to S103. If "Yes", the subroutine proceeds to S104.

In S104, the scene recognition result SR is set to portrait. Subsequently, the subroutine proceeds to processing subsequent to module[1] or, in other words, any one of processing subsequent to S73, S75, S77, and S79 or any one of processing subsequent to S85, S88, S91, and S94.

In S105, the scene recognition result SR is set to AUTO.

Figure 13:
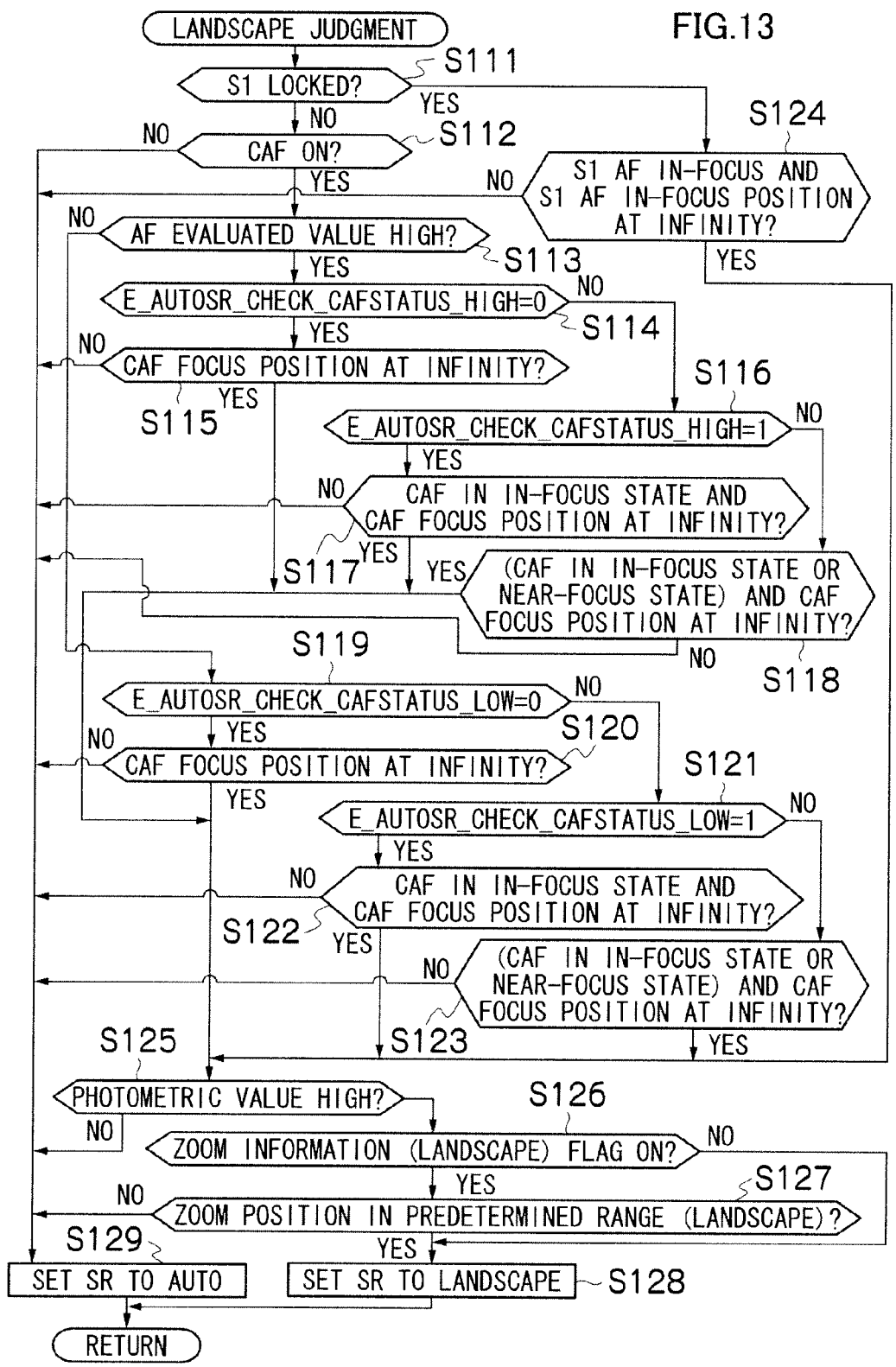
FIG. 13 is a flowchart of a scene judgment subroutine (landscape judgment)

FIG. 13 is a flowchart showing details of a scene judgment subroutine (landscape judgment, module[2]). Execution of the processing is controlled by the CPU 75 of the digital camera 1. A program defining the processing is stored in the ROM 68.

In S111, a determination is made on whether or not half-press (S1) of the release button has been locked. If "Yes", the subroutine proceeds to S124. If "No", the subroutine proceeds to S112.

In S112, a determination is made on whether or not the execution of continuous AF (hereinafter denoted to as "CAF") has been set in advance via settings menu or the manipulation section 11. If "Yes", the subroutine proceeds to S113. If "No", the subroutine proceeds to S129.

In S113, a determination is made on whether or not the AF evaluated value calculated by the pre-actual photography AF processing section 81 is higher than a predetermined threshold stored in the ROM 68. If "Yes", the subroutine proceeds to S114. If "No", the subroutine proceeds to S119. Moreover, the present step S113 may be omitted. In this case, the subroutine proceeds to S114 if "Yes" in S112. In addition, the various subsequent processing (S119, S120, S121, S122, and S123) when "No" is determined in S113 is also omitted.

In S114, a determination is made on whether or not E_AUTOSR_CHECK_CAFSTATUS_HIGH stored in the ROM 68 is 0. If "Yes", the subroutine proceeds to S115. If "No", the subroutine proceeds to S116.

In S115, a determination is made on whether or not an in-focus position decided as a result of the CAF is to the infinity (INF) side of a predetermined focal distance threshold stored in the ROM 68 or, in other words, whether or not the in-focus subject is more distant than a predetermined distance. If "Yes", the subroutine proceeds to S125. If "No", the subroutine proceeds to S129.

In S116, a determination is made on whether or not E_AUTOSR_CHECK_CAFSTATUS_HIGH=1 is true. If "Yes", the subroutine proceeds to S117. If "No", the subroutine proceeds to S118.

In S117, a determination is made on whether or not a local maximum point of the AF evaluated value has been detected as a result of the CAF, and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S118, a determination is made on whether or not a local maximum point of the AF evaluated value has been detected as a result of the CAF or the AF evaluated value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S119, a determination is made on whether or not E_AUTOSR_CHECK_CAFSTATUS_LOW stored in the ROM 68 is 0. If "Yes", the subroutine proceeds to S120. If "No", the subroutine proceeds to S121.

In S120, a determination is made on whether or not an in-focus position decided as a result of the CAF is to the infinity (INF) side of a predetermined focal distance threshold stored in the ROM 68 or, in other words, whether or not the in-focus position is more distant than a predetermined distance. If "Yes", the subroutine proceeds to S125. If "No", the subroutine proceeds to S129.

In S121, a determination is made on whether or not E_AUTOSR_CHECK_CAFSTATUS_LOW=1 is true. If "Yes", the subroutine proceeds to S122. If "No", the subroutine proceeds to S123.

In S122, a determination is made on whether or not a local maximum point of the AF evaluated value has been detected as a result of the CAF and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S123, a determination is made on whether or not a local maximum point of the AF evaluated value has been detected as a result of the CAF or the AF evaluated value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S124, a determination is made on whether or not an in-focus position has been determined by AF processing of the AF processing section 62 and a focal distance corresponding to the in-focus position is to the infinity (INF) side of a predetermined focal distance threshold stored in the ROM 68 or, in other words, whether or not the focal distance is greater than a predetermined distance. If "Yes", the subroutine proceeds to S125. If "No", the subroutine proceeds to S129.

In S125, a determination is made on whether or not the subject luminance measured by the control circuit 74 is lower than a predetermined threshold stored in the ROM 68. If "Yes", the subroutine proceeds to S126. If "No", the subroutine proceeds to S129.

In S126, a determination is made on whether or not a landscape zoom information flag has been set to ON in advance as a set parameter of ROM 68 or from the manipulation section 11. If "Yes", the subroutine proceeds to S126. If "No", the subroutine proceeds to S129.

In S127, a determination is made on whether or not the zoom lens position is within a predetermined range, such as on the wide side of a predetermined position. If "Yes", the subroutine proceeds to S128. If "No", the subroutine proceeds to S129. Note that the zoom position not being within a predetermined range refers to a case where, for example, the zoom lens position is at the tele end or the vicinity thereof. In this case, since a panoramic view cannot be fit into the field angle and is therefore unsuited for landscape photography, the photographic scene is determined to be AUTO.

In S128, SR is set to landscape. The subroutine then proceeds to processing subsequent to module[2].

In S129, SR is set to AUTO. The subroutine then proceeds to processing subsequent to module[2].

Figure 14:
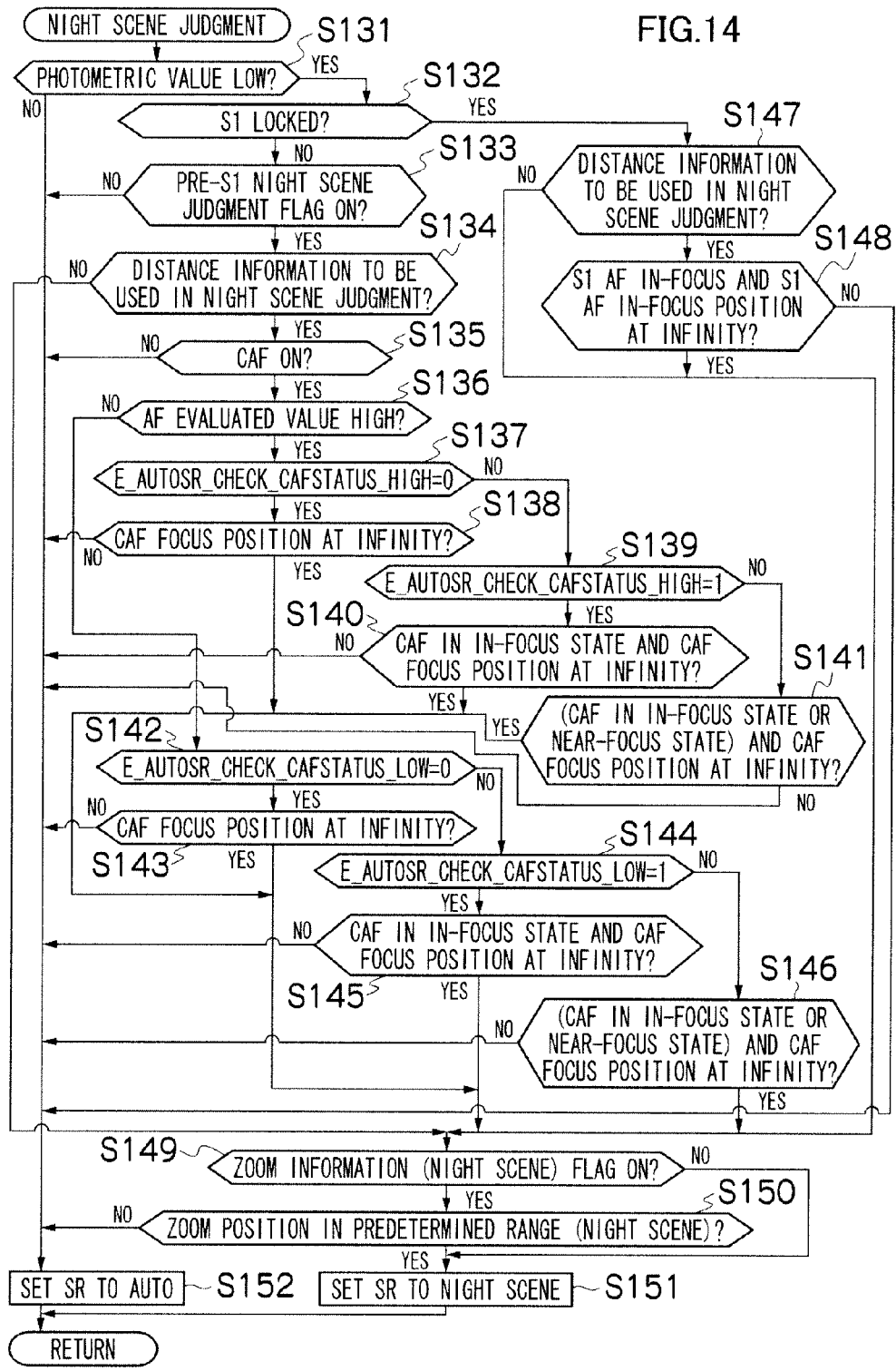
FIG. 14 is a flowchart of a scene judgment subroutine (night scene judgment)

FIG. 14 is a flowchart showing details of a scene judgment subroutine (night scene judgment, module[3]). Execution of the processing is controlled by the CPU 75 of the digital camera 1. A program defining the processing is stored in the ROM 68.

In S131, a determination is made on whether or not the subject luminance measured by the control circuit 74 is lower than a predetermined threshold stored in the ROM 68. If "Yes", the subroutine proceeds to S132. If "No", the subroutine proceeds to S152.

In S132, a determination is made on whether or not half-press (S1) of the release button has been locked. If "Yes", the subroutine proceeds to S147. If "No", the subroutine proceeds to S133.

In S133, a determination is made on whether or not a night scene judgment flag prior to half-press (S1) stored in the RAM 69 has been set to ON. If "Yes", the subroutine proceeds to S134. If "No", the main subroutine proceeds to S152.

In S134, a determination is made on whether or not distance information has been set to be used in night scene judgment by an input from the manipulation section 11 or a parameter stored in the ROM 68. If distance information has been set to be used in night scene judgment, the subroutine proceeds to S135. If distance information has not been set to be used in night scene judgment, the subroutine proceeds to S149.

In S135, a determination is made on whether or not the execution of CAF has been set in advance via settings menu or the manipulation section 11. If "Yes", the subroutine proceeds to S136. If "No", the main subroutine proceeds to S152.

In S136, a determination is made on whether or not the AF evaluated value calculated by the pre-actual photography AF processing section 81 is higher than a predetermined threshold stored in the ROM 68. If "Yes", the subroutine proceeds to S137. If "No", the subroutine proceeds to S142. Moreover, the present step S136 may be omitted. In this case, the subroutine proceeds to S137 if "Yes" in S135. In addition, the various subsequent processing when "No" is determined in S136 is also omitted.

In S137, a determination is made on whether or not E_AUTOSR_CHECK_CAFSTATUS_HIGH=0 is true. If "Yes", the subroutine proceeds to S138. If "No", the subroutine proceeds to S139.

In S138, a determination is made on whether or not an in-focus position decided as a result of the CAF is to the infinity (INF) side of a predetermined focal distance threshold stored in the ROM 68 or, in other words, whether or not the in-focus position is more distant than a predetermined distance. If "Yes", the subroutine proceeds to S149. If "No", the subroutine proceeds to S152.

In S139, a determination is made on whether or not E_AUTOSR_CHECK_CAFSTATUS_HIGH=1 is true. If "Yes", the subroutine proceeds to S140. If "No", the subroutine proceeds to S141.

In S140, a determination is made on whether or not a local maximum point of the AF evaluated value has been detected as a result of the CAF and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S141, a determination is made on whether or not a local maximum point of the AF evaluated value has been detected as a result of the CAF or the AF evaluated value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S142, a determination is made on whether or not E_AUTOSR_CHECK_CAFSTATUS_LOW=0 is true. If "Yes", the subroutine proceeds to S143. If "No", the subroutine proceeds to S144.

In S143, a determination is made on whether or not an in-focus position decided as a result of the CAF is to the infinity (INF) side of a predetermined focal distance threshold stored in the ROM 68 or, in other words, whether or not the in-focus position is more distant than a predetermined distance. If "Yes", the subroutine proceeds to S149. If "No", the subroutine proceeds to S152.

In S144, a determination is made on whether or not E_AUTOSR_CHECK_CAFSTATUS_LOW=1 is true. If "Yes", the subroutine proceeds to S145. If "No", the subroutine proceeds to S146.

In S145, a determination is made on whether or not a local maximum point of the AF evaluated value has been detected as a result of the CAF and a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S146, a determination is made on whether or not a local maximum point of the AF evaluated value has been detected as a result of the CAF or the AF evaluated value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S147, a determination is made on whether or not distance information has been set to be used in night scene judgment by an input from the manipulation section 11 or a parameter stored in the ROM 68. If distance information has been set to be used in night scene judgment, the subroutine proceeds to S148. If distance information has not been set to be used in night scene judgment, the subroutine proceeds to S149.

In S148, a determination is made on whether or not an in-focus position has been determined by AF processing of the AF processing section 62 and a focal distance corresponding to the in-focus position is to the infinity (INF) side of a predetermined focal distance threshold stored in the ROM 68 or, in other words, whether or not the focal distance is greater than a predetermined distance. If "Yes", the subroutine proceeds to S149. If "No", the subroutine proceeds to S152.

In S149, a determination is made on whether or not a night scene zoom information flag has been set to ON in advance as a set parameter of ROM 68 or from the manipulation section 11. If "Yes", the subroutine proceeds to S150. If "No", the subroutine proceeds to S151.

In S150, a determination is made on whether or not the zoom lens position is within a predetermined range, such as on the wide side of a predetermined position. If "Yes", the subroutine proceeds to S151. If "No", the subroutine proceeds to S152. Note that the zoom position not being within a predetermined range refers to a case where, for example, the zoom lens position is at the tele end or the vicinity thereof. In this case, since a background distant landscape with low incident light intensity cannot be fit into the field angle and is therefore unsuited for night scene photography, the photographic scene is determined to be AUTO.

In S151, SR is set to night scene. The subroutine then proceeds to processing subsequent to module[3].

In S152, SR is set to AUTO. The subroutine then proceeds to processing subsequent to module[3].

Figure 15:
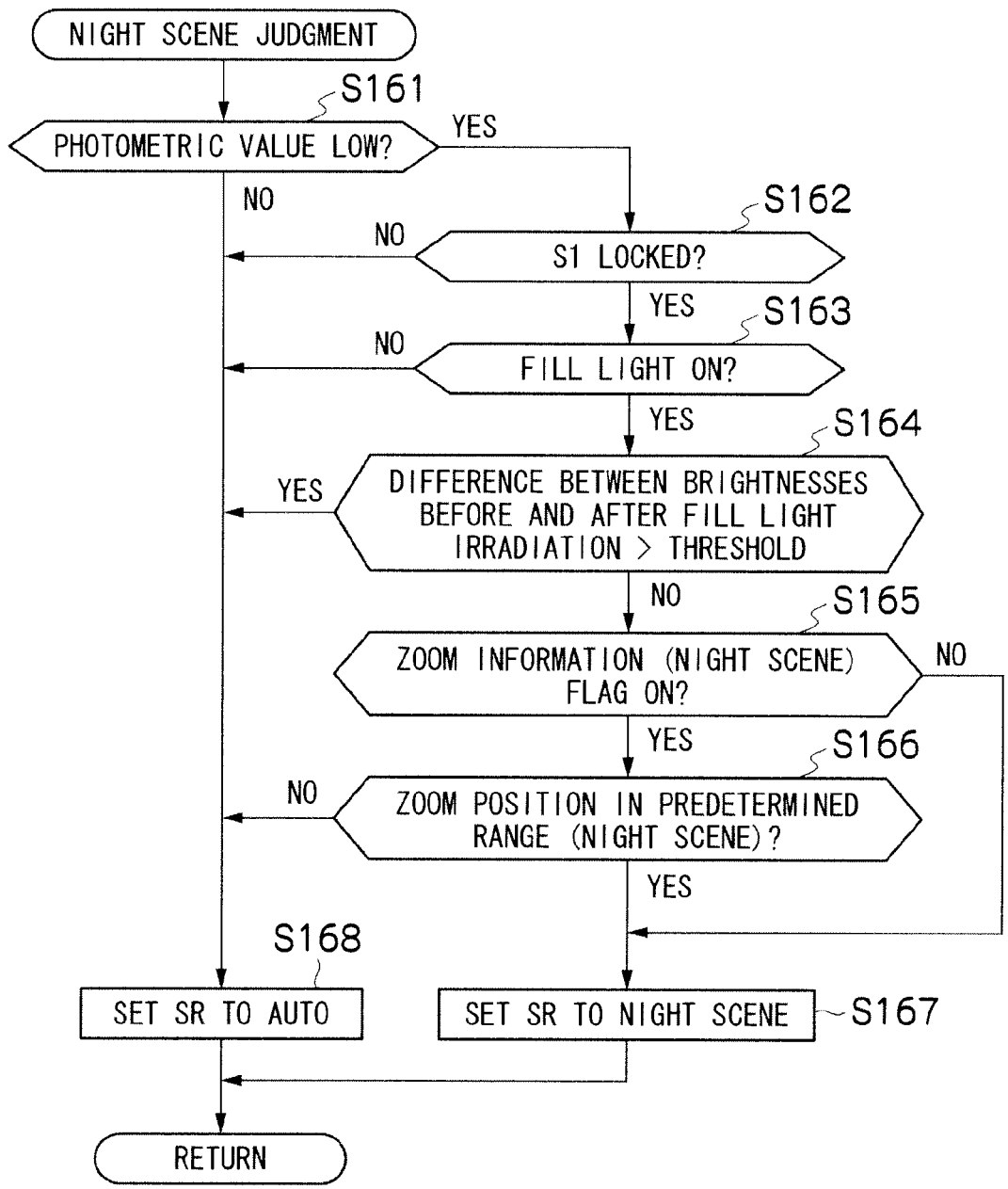
FIG. 15 is another example of a flowchart of a scene judgment subroutine (night scene judgment)

FIG. 15 is a flowchart showing another example of a scene judgment subroutine (night scene judgment, module[3]). Execution of the processing is controlled by the CPU 75 of the digital camera 1. A program defining the processing is stored in the ROM 68. For night scene judgment, adopting either FIG. 11 or 12 shall suffice. Alternatively, an arrangement is also possible in which either one is selectively executed.

In S161, a determination is made on whether or not the subject luminance measured by the control circuit 74 is lower than a predetermined threshold stored in the ROM 68. If "Yes", the subroutine proceeds to S162. If "No", the subroutine proceeds to S168. This threshold may either be the same as or different from the threshold for judging whether or not emission is to be instructed to the fill light control section 25.

In S162, a determination is made on whether or not half-press (S1) of the release button has been locked. If "Yes", the subroutine proceeds to S163. If "No", the subroutine proceeds to S168.

In S163, a determination is made on whether or not emission of the fill light emitting section 26 has been instructed to the fill light control section 25. If "Yes", the subroutine proceeds to S164. If "No", the subroutine proceeds to S168.

In S164, a determination is made on whether or not a difference between subject luminances respectively measured by the control circuit 74 immediately before and immediately after the fill light control section 25 causes the fill light emitting section 26 to be emitted exceeds a predetermined threshold stored in the ROM 68. If "Yes", the subroutine proceeds to S168. If "No", the subroutine proceeds to S165. Moreover, if the difference has not exceeded the threshold and is minute, it may be described that the contribution of an increase in subject luminance due to fill light irradiation is minimal and the subject is not near.

In S165, a determination is made on whether or not the night scene zoom information flag has been set to ON in advance as a set parameter of ROM 68 or from the manipulation section 11. If "Yes", the subroutine proceeds to S166. If "No", the subroutine proceeds to S167.

In S166, a determination is made on whether or not the zoom lens position is within a predetermined range, such as on the wide side of a predetermined position. If "Yes", the subroutine proceeds to S167. If "No", the subroutine proceeds to S168. Note that the zoom position not being within a predetermined range refers to a case where, for example, the zoom lens position is at the tele end or the vicinity thereof. In this case, a background distant landscape cannot be fit into the field angle and is therefore unsuited for night scene photography.

In S167, SR is set to night scene. The subroutine then proceeds to processing subsequent to module[3].

In S168, SR is set to AUTO. The subroutine then proceeds to processing subsequent to module[3].

Figure 16:
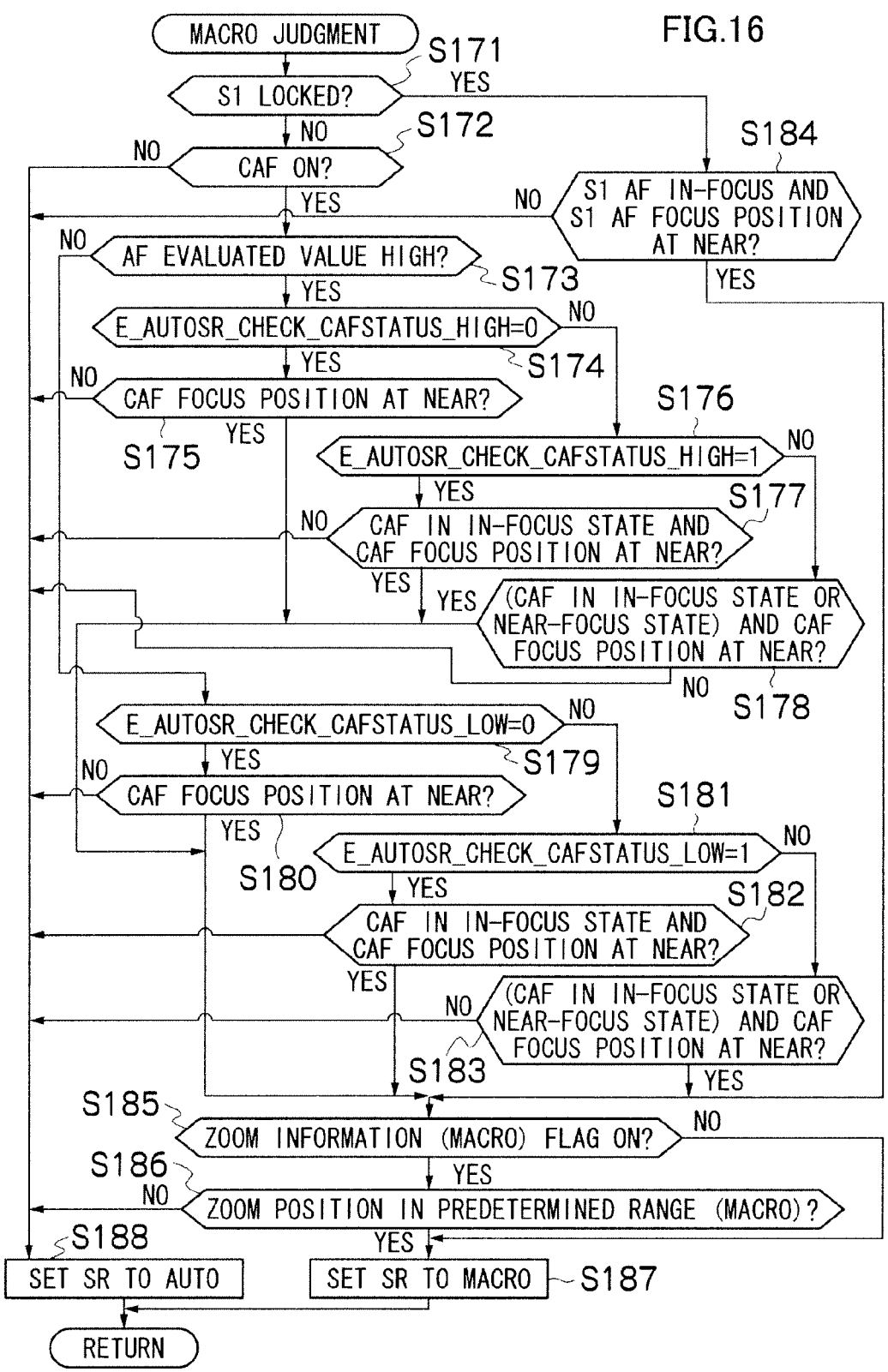
FIG. 16 is a flowchart of a scene judgment subroutine (macro judgment)

FIG. 16 is a flowchart showing details of a scene judgment subroutine (macro judgment, module[4]). Execution of the processing is controlled by the CPU 75 of the digital camera 1. A program defining the processing is stored in the ROM 68.

In S171, a determination is made on whether or not half-press (S1) of the release button has been locked. If "Yes", the subroutine proceeds to S184. If "No", the subroutine proceeds to S172.

In S172, a determination is made on whether or not the execution of CAF has been set in advance via settings menu or the manipulation section 11. If "Yes", the subroutine proceeds to S173. If "No", the subroutine proceeds to S188.

In S173, a determination is made on whether or not the AF evaluated value calculated by the pre-actual photography AF processing section 81 is higher than a predetermined threshold stored in the ROM 68. If "Yes", the subroutine proceeds to S174. If "No", the subroutine proceeds to S179. Moreover, the present step S173 may be omitted. In this case, the subroutine proceeds to S174 if "Yes" in S172. In addition, the various subsequent processing is also omitted when "No" is determined in S173.

In S174, a determination is made on whether or not E_AUTOSR_CHECK_CAFSTATUS_HIGH=0 is true. If "Yes", the subroutine proceeds to S175. If "No", the subroutine proceeds to S176.

In S175, a determination is made on whether or not an in-focus position decided as a result of the CAF is to the near (NEAR) side of a predetermined focal distance threshold stored in the ROM 68 or, in other words, whether or not the in-focus position is closer than a predetermined distance. If "Yes", the subroutine proceeds to S185. If "No", the subroutine proceeds to S188.

In S176, a determination is made on whether or not E_AUTOSR_CHECK_CAFSTATUS_HIGH=1 is true. If "Yes", the subroutine proceeds to S177. If "No", the subroutine proceeds to S178.

In S177, a determination is made on whether or not a local maximum point of the AF evaluated value has been detected as a result of the CAF, and a focal distance corresponding to the in-focus position determined by the local maximum point is to the near (NEAR) side of a predetermined focal distance threshold stored in the ROM 68 or, in other words, whether or not the focal distance is shorter than a predetermined distance. If "Yes", the subroutine proceeds to S185. If "No", the subroutine proceeds to S188.

In S178, a determination is made on whether or not a local maximum point of the AF evaluated value has been detected as a result of the CAF or the AF evaluated value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the near (NEAR) side of a predetermined focal distance threshold stored in the ROM 68 or, in other words, whether or not the focal distance is closer than a predetermined distance. If "Yes", the subroutine proceeds to S185. If "No", the subroutine proceeds to S188.

In S179, a determination is made on whether or not E_AUTOSR_CHECK_CAFSTATUS_LOW=0 is true. If "Yes", the subroutine proceeds to S180. If "No", the subroutine proceeds to S181.

In S180, a determination is made on whether or not an in-focus position decided as a result of the CAF is to the near (NEAR) side of a predetermined focal distance threshold stored in the ROM 68 or, in other words, whether or not the in-focus position is closer than a predetermined distance. If "Yes", the subroutine proceeds to S185. If "No", the subroutine proceeds to S188.

In S181, a determination is made on whether or not E_AUTOSR_CHECK_CAFSTATUS_LOW=1 is true. If "Yes", the subroutine proceeds to S182. If "No", the subroutine proceeds to S183.

In S182, a determination is made on whether or not a local maximum point of the AF evaluated value has been detected as a result of the CAF, and a focal distance corresponding to the in-focus position determined by the local maximum point is to the near (NEAR) side of a predetermined focal distance threshold stored in the ROM 68 or, in other words, whether or not the focal distance is shorter than a predetermined distance. If "Yes", the subroutine proceeds to S185. If "No", the subroutine proceeds to S188.

In S183, a determination is made on whether or not a local maximum point of the AF evaluated value has been detected as a result of the CAF or the AF evaluated value is in the vicinity of the local maximum point (such as a case where the subroutine is in the stage of "fine adjustment" described in paragraph 0041 of Japanese Patent Application Laid-Open No. 2003-348426 by the present applicant), and whether or not a focal distance corresponding to the in-focus position determined by the local maximum point is to the near (NEAR) side of a predetermined focal distance threshold stored in the ROM 68 or, in other words, whether or not the focal distance is closer than a predetermined distance. If "Yes", the subroutine proceeds to S185. If "No", the subroutine proceeds to S188.

In S184, a determination is made on whether or not an in-focus position has been determined by AF processing of the AF processing section 62 and a focal distance corresponding to the in-focus position is to the near (NEAR) side of a predetermined focal distance threshold stored in the ROM 68 or, in other words, whether or not the focal distance is closer than a predetermined distance. If "Yes", the subroutine proceeds to S185. If "No", the subroutine proceeds to S188.

In S185, a determination is made on whether or not a macro zoom information flag has been set to ON in advance as a set parameter of ROM 68 or from the manipulation section 11. If "Yes", the subroutine proceeds to S186. If "No", the subroutine proceeds to S187.

In S186, a determination is made on whether or not the zoom lens position is within a predetermined range stored in the ROM 68, such as on the wide side of a predetermined position. If "Yes", the subroutine proceeds to S187. If "No", the subroutine proceeds to S188. Note that the zoom position not being within a predetermined range refers to a case where, for example, the zoom lens position is at anywhere other than the wide end or the vicinity thereof. In this case, focusing of the proximal subject cannot be achieved and is therefore unsuited for close photography.

In S187, SR is set to macro. The subroutine then proceeds to processing subsequent to module[4].

In S188, SR is set to AUTO. The subroutine then proceeds to processing subsequent to module[4].

Results of the scene judgments shown in FIGS. 12 to 16 are controlled by a CPU 95 so as to be displayed on the display section 71.

For example, as shown in FIG. 3, characters such as "landscape", "AUTO", "portrait", "night scene", "macro", and the like which are results of scene judgments are superimposed on a live view or a recording image subsequent to the release button being fully pressed, and displayed on the display section 71. Character strings, icons, symbols, and other information indicating scene judgment results are generated by an OSD circuit, not shown. If the camera 1 is provided with an sound processing circuit or a speaker, the sound processing circuit or the speaker may be controlled by the CPU 95 so as to output an alarm sound corresponding to the scene judgment result. The scene judgment result is not displayed if "automatic scene recognition OFF" has been set.

From the processing described above, it is possible to recognize what kind of scene a user is attempting to photograph or has already photographed.

In the main processing shown in FIG. 5, scene recognition is performed upon scene change. A frame status when the previous scene recognition result is finalized and changes in the state of a current frame are monitored (S4, FIG. 6). If it is determined that a scene change has occurred when a change has occurred (S5), "status" enters a search state (S6), and the recognizing section becomes operational at the timing of the scene change (S9).

In the frame change check shown in FIG. 6, a plurality of factors that detect change can be retained, and the order thereof can be shuffled through the settings of E_AUTOSR_FRAME_CHECK1 to 3. When a change is detected, the value of change_measure that becomes an indicator of frame change is incremented (S24, S28, S32). When the value of change_measure is equal to or greater than E_AUTOSR_FRAME_CHANGE_MEASURE ("Yes" in S25, S29, S33), it is determined that a frame change has occurred (S35).

Here, photometric value change check (FIG. 7), focus position change check (FIG. 8), and face presence/absence change check (FIG. 9) are shown as specific processing for detecting a frame change. Moreover, although not shown, a frame change may alternatively be detected depending on the occurrence/nonoccurrence of in-focus detection by the pre-actual photography AF processing section 81.

In the photometric value change check shown in FIG. 7, delta_ev that acts as an indicator of a photometric value change amount is determined by calculating a photometric value change amount for each of N segmented areas, performing weighting corresponding to the respective areas, and taking a summation thereof. Furthermore, an occurrence of a photometric value change is determined when the value of delta_ev is equal to or greater than E_AUTOSP_FRAME_DELTA_EV.

In the focus position change check in FIG. 8, delta_focal_point that acts as an indicator of a focus position change amount is calculated as a difference between the focus position in the reference information and a current focus position. An occurrence of a photometric value change is determined when the value of delta_focal_point is equal to or greater than a focus position change threshold. Moreover, the threshold used here is assumed having been set in ROM 68 for each zoom position.

In the face presence/absence change check in FIG. 9, it is determined that a face presence/absence change has occurred when the face presence/absence result in the reference information and the current face presence/absence result differ from each other.

Scene recognition history records used in the difference in operations of the recognizing section are cleared after obtaining an SR to be adopted as a result of automatic scene recognition (S8). This is performed because the recognizing section is not assumed to be always operational and to prevent information on separated time points from being referenced.

Here, in order to clear scene recognition history records, an arrangement is provided in which SR is not updated from the point where a search state is entered (S6) and until the recognizing section operates for a number of times corresponding to the number of scene recognition history records to be referenced (until S11 results in "Y").

In addition, upon determining SR, the adopted (newest) information having SR with greatest frequency is stored as reference information for checking frame changes (S13).

Moreover, a "finalized state" is entered when the determined SR is other than AUTO (S16), and the recognizing section is not operated until the scene changes. On the other hand, a "search state" is entered when the determined SR is AUTO (S15), whereby the recognizing section is operated. This is because setting a result recognized during a scene change to a "finalized state" may possibly prevent the scene change from being correctly detected.

If, for example, a frame change is checked after a state in the middle of a scene change is registered as reference information, a phenomenon may occur in which the recognizing section cannot be operated due to the small difference from the reference information even when it is desired that the recognizing section become operational in a state where the scene change is ultimately concluded. Therefore, in order to avoid this phenomenon, processing is performed to update the reference information with information corresponding to a finalized scene as described above (S13).

Unless the result of scene recognition can be stabilized, an output result will confuse the user. In consideration thereof, by combiningly performing processing for determining what type of scene a particular scene is (S7 to S16) and processing for monitoring whether or not a change has occurred from a recognized scene (S4 to S6), it is now possible to perform scene recognition in an accurate and stable manner.

Another Embodiment

Next, another embodiment will be described in which various functions are controlled based on a scene recognition result and a face detection result.

Figure 17:
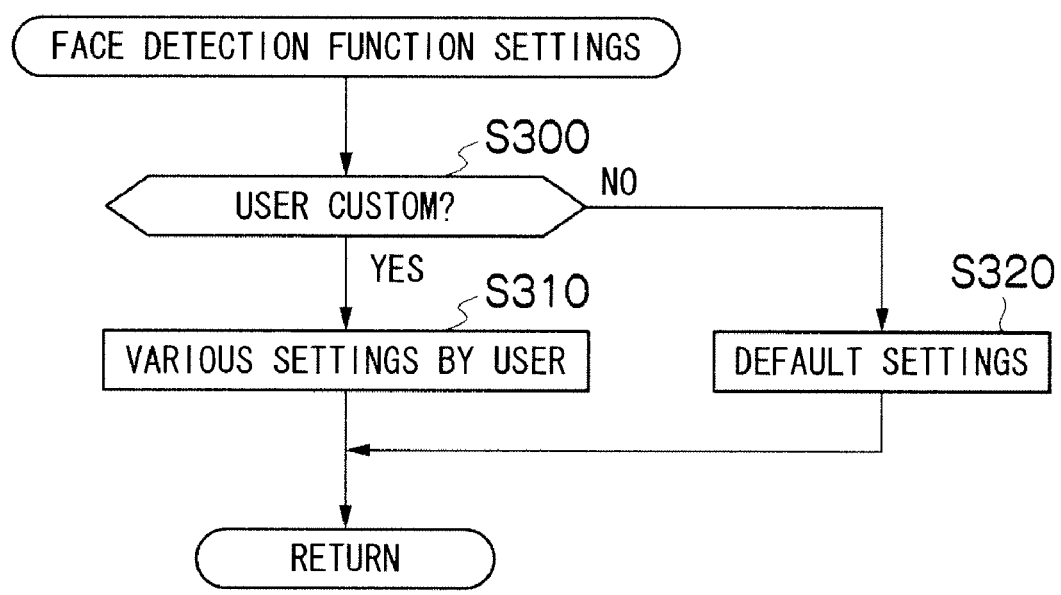
FIG. 17 is a flowchart showing a method of setting controls for various functions using face detection.

FIG. 17 is a flowchart showing a method of setting controls for various functions using face detection.

In S300, a discrimination is made on whether "custom settings" or "default settings" is to be performed by the user. When "Yes", the processing transitions to S310, and when "No", the processing transitions to S320.

FIG. 18 shows an example of a setting screen of the digital camera 1 for selecting between "custom settings" and "default settings".

Figures 18A, 18B:
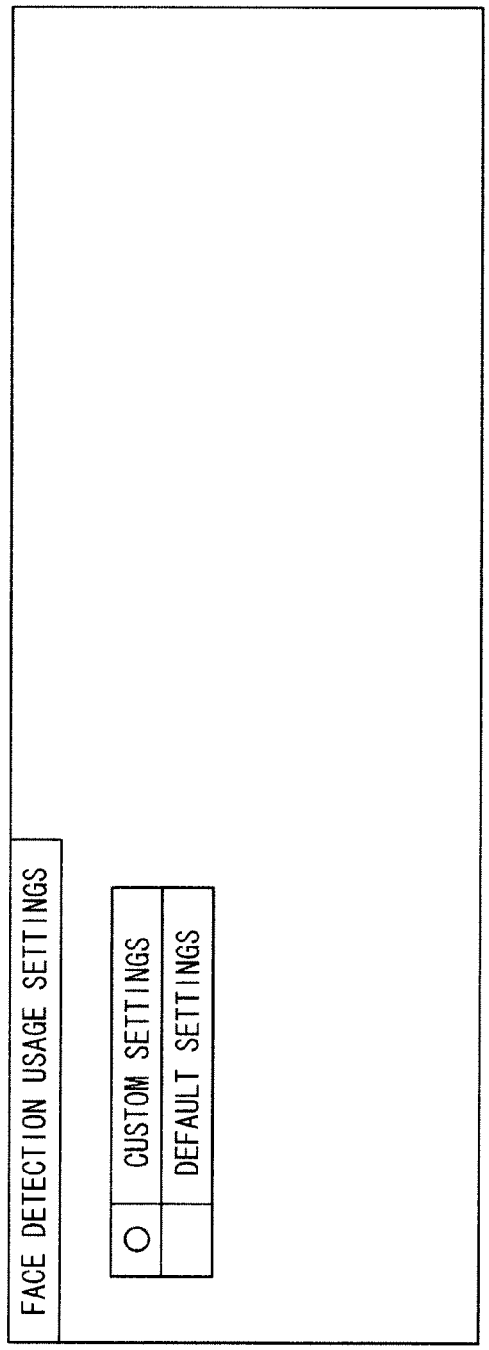
FIGS. 18A and 18B are diagrams showing an example of a face detection function setting screen.

For example, by manipulating the menu/OK button of the digital camera 1 to cause a face detection usage setting menu shown in FIG. 18A to be displayed on the display section 71 and then manipulating the upward/downward arrow lever, "custom settings" or "default settings" can be arbitrarily selected.

At this point, by selecting "custom settings" and pressing the menu/OK button, a transition is made to a "custom settings" detail screen as shown in FIG. 18B. On this screen, the user is able to arbitrarily set control methods of the various functions using face detection.

In the example shown in FIG. 18B, the controls of "face AF", "face AWB" and "face tonal correction" are set not to be performed when the scene is "landscape", "night scene", and "macro".

In S310 of FIG. 17, "custom settings" is set. Consequently, settings of the various functions using face detection which is set by the user are applied as the control method of the various functions.

On the other hand, in S320, "default settings" is set. Consequently, settings of the various functions using face detection which have been preset before shipment of the digital camera 1 are applied as the control method of the various functions.

In other words, the digital camera 1 includes a table for "default settings" and a table for "custom settings", and is arranged such that the user can select which of the tables is to be applied. In addition, contents (such as ON/OFF of controls) of the "custom settings" table is arranged so as to be rewriteable by the user by inputting instructions.

While the example shown in FIG. 18B is arranged such that the various functions are to be controlled on an ON/OFF basis in the same manner as the example shown in FIG. 4, a mechanism is also possible in which the intensities of the various functions are classified into several levels and one of such levels is set.

Furthermore, it is to be understood that the present invention is not limited to the examples presented above and that many variations and modifications may be made without departing from the spirit and scope of the present invention.

What is claimed is:

1. An imaging apparatus, comprising:
   an information acquiring device which acquires information on a photographic scene;
   a scene recognizing device which recognizes a photography scene by applying the photographic scene to a plurality of predefined scenes from the acquired information;
   a face detecting device which detects whether a face exists in the photographic scene; and
   a control device which performs various controls based on a scene recognition result and a face detection result, wherein the scene recognizing device comprises a scene change discriminating device which discriminates whether a scene has changed based on reference information stored in a storage device and the information acquired by the information acquiring device, and wherein the scene recognizing device performs a scene recognition when it is discriminated that the scene has changed.

2. The imaging apparatus according to claim 1, wherein the information acquiring device acquires at least one type of information among information indicating whether the face exists in the photographic scene, information corresponding to a distance of a subject, and information corresponding to a brightness of the subject.

3. The imaging apparatus according to claim 1, wherein the control device includes two or more of:
- a display control device which explicitly displays a position of a detected face on a screen of a display device displaying a live view image;
- an exposure control device which controls an exposure based on a brightness of an area of the detected face;
- an automatic focus adjusting device which performs a focus adjustment so that the detected face comes into focus;
- a white balance adjusting device which adjusts a white balance based on color information of the area of the detected face; and
- a face tonal correcting device which performs a tonal correction based on the brightness of the area of the detected face.

4. The imaging apparatus according to claim 2, wherein the control device includes two or more of:
- a display control device which explicitly displays a position of a detected face on a screen of a display device displaying a live view image;
- an exposure control device which controls an exposure based on a brightness of an area of the detected face;
- an automatic focus adjusting device which performs a focus adjustment so that the detected face comes into focus;
- a white balance adjusting device which adjusts a white balance based on color information of the area of the detected face; and
- a face tonal correcting device which performs a tonal correction based on the brightness of the area of the detected face.

5. The imaging device according to claim 1, wherein the scene recognizing device includes an interval setting device which sets a predetermined interval at which scene recognition is performed, and the scene recognizing device performs a scene recognition of the photographic scene based on information acquired by the information acquiring device at the predetermined interval set by the interval setting device.

6. The imaging apparatus according to claim 1, wherein the scene recognition section determines whether the photographic scene comprises one of a portrait, a landscape, a night scene, and a macro.

7. The imaging apparatus according to claim 1, wherein the control device comprises a table that stores information indicating whether control is to be performed for each control type or information indicating an intensity of control in correspondence with scene types and types of said various controls.

8. The imaging apparatus according to claim 7, wherein, based on the scene recognition result and the face detection result, the control device reads corresponding information from the table to perform said various controls.

9. An imaging apparatus, comprising:
an information acquiring device which acquires information on a photographic scene;
a scene recognizing device which recognizes a scene from the acquired information;
a face detecting device which detects whether a face exists in the photographic scene; and
a control device which performs various controls based on a scene recognition result and a face detection result,
wherein the control device stores information indicating whether control is to be performed for each control type or information indicating an intensity of control in correspondence with scene types and types of said various controls, and based on the scene recognition result and the face detection result, reads corresponding information from the stored information to perform said various controls,
wherein the scene recognizing device comprises a scene change discriminating device which discriminates whether a scene has changed based on reference information stored in a storage device and the information acquired by the information acquiring device, and
wherein the scene recognizing device performs a scene recognition when it is discriminated that the scene has changed.

10. An imaging apparatus, comprising:
an information acquiring device which acquires information on a photographic scene;
a scene recognizing device which recognizes a scene from the acquired information;
a face detecting device which detects whether a face exists in the photographic scene; and
a control device which performs various controls based on a scene recognition result and a face detection result,
wherein the information acquiring device acquires at least one type of information among information indicating whether the face exists in the photographic scene, information corresponding to a distance of a subject, and information corresponding to a brightness of the subject,
wherein the control device comprises at least two of:
- a display control device which explicitly displays a position of a detected face on a screen of a display device displaying a live view image;
- an exposure control device which controls an exposure based on a brightness of an area of the detected face;
- an automatic focus adjusting device which performs a focus adjustment so that the detected face comes into focus;
- a white balance adjusting device which adjusts a white balance based on color information of the area of the detected face; and
- a face tonal correcting device which performs a tonal correction based on the brightness of the area of the detected face, and
wherein the control device stores information indicating whether control is to be performed for each control type or information indicating an intensity of control in correspondence with scene types and types of said various controls, and based on the scene recognition result and the face detection result, reads corresponding information from the stored information to perform said various controls,
wherein the scene recognizing device comprises a scene change discriminating device which discriminates whether a scene has changed based on reference information stored in a storage device and the information acquired by the information acquiring device and wherein the scene recognizing device performs a scene recognition when it is discriminated that the scene has changed.

11. The imaging apparatus according to claim 10, further comprising a custom setting device that enables a user to freely set said information stored in the control device.

12. The imaging apparatus according to claim 11, wherein the storage device stores information corresponding to a recognized scene as the reference information.

13. The imaging device according to claim 11, wherein the scene recognizing device includes an interval setting device which sets a predetermined interval at which scene recognition is performed, and the scene recognizing device performs a scene recognition of the photographic scene based on information acquired by the information acquiring device at the predetermined interval set by the interval setting device.

14. An imaging apparatus, comprising:
an information acquiring device which acquires information on a photographic scene:
a scene recognizing device which recognizes a scene from the acquired information;
a face detecting device which detects whether a face exists in the photographic scene; and
a control device which performs various controls based on a scene recognition result and a face detection result,
wherein the control device stores information indicating whether control is to be performed for each control type or information indicating an intensity of control in correspondence with scene types and types of various controls, and based on a scene recognition result and a face detection result, reads corresponding information from the stored information to perform said various controls, and
wherein the imaging apparatus further comprises a custom setting device that enables a user to freely set said information stored in the control device,
wherein the scene recognizing device comprises a scene change discriminating device which discriminates whether a scene has changed based on reference information stored in a storage device and the information acquired by the information acquiring device, and
wherein the scene recognizing device performs a scene recognition when it is discriminated that the scene has changed.

15. An imaging apparatus, comprising:
an information acquiring device which acquires information on a photographic scene;
a scene recognizing device which recognizes a scene from the acquired information;
a face detecting device which detects whether a face exists in the photographic scene; and
a control device which performs various controls based on a scene recognition result and a face detection result,
wherein the scene recognizing device includes:
a storage device which stores information corresponding to a recognized scene as reference information; and
a scene change discriminating device which discriminates whether a scene has changed based on the reference information stored in the storage device and the information acquired by the information acquiring device, and
wherein the scene recognizing device performs a scene recognition when it is discriminated that the scene has changed.

16. An imaging method, comprising:
acquiring information on a photographic scene;
recognizing a photography scene by applying the photographic scene to a plurality of predefined scenes from the acquired information;
detecting whether a face exists in the photographic scene; and
performing various controls based on the scene recognition result and the face detection result,
wherein the recognizing the photography scene comprises a scene change discriminating which discriminates whether a scene has changed based on reference information stored in a storage device and the information acquired, and
wherein the recognizing the photography scene performs scene recognition when it is discriminated that the scene has changed.

17. The imaging method according to claim 16, wherein said performing said various controls comprises storing, in a table, information indicating whether control is to be performed for each control type or information indicating an intensity of control in correspondence with scene types and types of said various controls,
wherein, based on the scene recognition result and the face detection result, corresponding information from the table to perform said various controls is read.

18. The imaging method according to claim 16, wherein said recognizing the photography scene further comprises:
storing information corresponding to a recognized scene as the reference information.

19. The imaging method according to claim 16, wherein said recognizing the photography scene comprises determining whether the photographic scene comprises one of a portrait, a landscape, a night scene, and a macro.

* * * * *